(12) United States Patent
Milligan et al.

(10) Patent No.: US 10,530,723 B2
(45) Date of Patent: Jan. 7, 2020

(54) AUTOMATIC SUGGESTIONS FOR MESSAGE EXCHANGE THREADS

(71) Applicant: Google LLC, Mountain View, CA (US)

(72) Inventors: Timothy Seeds Milligan, Woodinville, WA (US); Hila Shemer, Mountain View, CA (US); Dennis Kiilerich, Seattle, WA (US); Gang Ji, Bothell, WA (US); Ori Gershony, Redmond, WA (US); Sergey Nazarov, Saratov (RU); Pranav Khaitan, Mountain View, CA (US); Sushant Prakash, Mountain View, CA (US); Anton Volkov, San Francisco, CA (US); Ricardo Escutia, Seattle, WA (US); David Citron, Kirkland, WA (US)

(73) Assignee: Google LLC, Mountain View, CA (US)

( * ) Notice: Subject to any disclaimer, the term of this patent is extended or adjusted under 35 U.S.C. 154(b) by 172 days.

(21) Appl. No.: 15/386,162

(22) Filed: Dec. 21, 2016

(65) Prior Publication Data

US 2017/0180294 A1     Jun. 22, 2017

Related U.S. Application Data

(60) Provisional application No. 62/270,454, filed on Dec. 21, 2015.

(51) Int. Cl.
*H04L 12/58* (2006.01)
*H04L 29/08* (2006.01)

(52) U.S. Cl.
CPC ............. *H04L 51/16* (2013.01); *H04L 51/02* (2013.01); *H04L 67/20* (2013.01); *H04L 51/046* (2013.01); *H04L 51/063* (2013.01)

(58) Field of Classification Search
CPC ...................................... H04L 51/16
See application file for complete search history.

(56) References Cited

U.S. PATENT DOCUMENTS

| 6,092,102 A | 7/2000 | Wagner |
|---|---|---|
| D599,363 S | 9/2009 | Mays |
| (Continued) | | |

FOREIGN PATENT DOCUMENTS

| CN | 1475908 | 2/2004 |
|---|---|---|
| CN | 102222079 | 10/2011 |
| (Continued) | | |

OTHER PUBLICATIONS

International Search Report and Written Opinion of PCT Ser. No. PCT/US16/68059 dated Mar 9, 2017.

(Continued)

*Primary Examiner* — Suraj M Joshi
(74) *Attorney, Agent, or Firm* — IP Spring

(57) ABSTRACT

A system and method for identifying an entity from a message exchange thread and generating a suggestion that is directed to the entity, such as a suggestion for a user to take an action on the entity. A suggestion application receives at least one electronic message from a message exchange thread, identifies an entity that can be actionable from the electronic message, determines contextual indicators of the entity, determines whether the entity is actionable based on the contextual indicators, and responsive to the entity being actionable, provides a suggestion that is directed to the entity to a participant(s) of the message exchange thread.

19 Claims, 16 Drawing Sheets

(56) References Cited

U.S. PATENT DOCUMENTS

| | | |
|---|---|---|
| 7,603,413 B1 | 10/2009 | Herold et al. |
| D611,053 S | 3/2010 | Kanga et al. |
| D624,927 S | 10/2010 | Allen et al. |
| D648,343 S | 11/2011 | Chen |
| D648,735 S | 11/2011 | Arnold |
| D651,609 S | 1/2012 | Pearson et al. |
| D658,201 S | 4/2012 | Gleasman et al. |
| D658,677 S | 5/2012 | Gleasman et al. |
| D658,678 S | 5/2012 | Gleasman et al. |
| 8,266,109 B1 | 9/2012 | Bilsborough |
| D673,172 S | 12/2012 | Peters |
| 8,391,618 B1 | 3/2013 | Chuang et al. |
| 8,423,577 B1 | 4/2013 | Lee et al. |
| 8,515,958 B2 | 8/2013 | Knight |
| 8,554,701 B1 | 10/2013 | Dillard et al. |
| 8,589,407 B2 | 11/2013 | Bhatia |
| D695,755 S | 12/2013 | Hwang et al. |
| D716,338 S | 1/2014 | Lee |
| D699,739 S | 2/2014 | Voreis et al. |
| D699,744 S | 2/2014 | Ho Kushner |
| 8,650,210 B1 | 2/2014 | Cheng et al. |
| D701,228 S | 3/2014 | Lee |
| D701,527 S | 3/2014 | Brinda et al. |
| D701,528 S | 3/2014 | Brinda et al. |
| 8,688,698 B1 | 4/2014 | Black et al. |
| 8,700,480 B1 | 4/2014 | Fox et al. |
| D704,726 S | 5/2014 | Maxwell |
| D705,244 S | 5/2014 | Arnold et al. |
| D705,251 S | 5/2014 | Pearson et al. |
| D705,802 S | 5/2014 | Kerr et al. |
| D706,802 S | 6/2014 | Myung et al. |
| 8,825,474 B1 | 9/2014 | Zhai et al. |
| D714,821 S | 10/2014 | Chand et al. |
| 8,938,669 B1 | 1/2015 | Cohen |
| 8,996,639 B1 | 3/2015 | Faaborg et al. |
| 9,191,786 B2 | 11/2015 | Davis |
| 9,213,941 B2 | 12/2015 | Petersen |
| 9,230,241 B1 | 1/2016 | Singh et al. |
| 9,262,517 B2 | 2/2016 | Feng et al. |
| 9,560,152 B1 | 1/2017 | Jamdar et al. |
| 9,674,120 B2 | 6/2017 | Davis |
| 9,715,496 B1 | 7/2017 | Sapoznik et al. |
| 9,805,371 B1 | 10/2017 | Sapoznik et al. |
| 9,807,037 B1 | 10/2017 | Sapoznik et al. |
| 9,817,813 B2 | 11/2017 | Faizakof et al. |
| 10,129,193 B2 | 11/2018 | Mahmoud et al. |
| 10,146,748 B1 | 12/2018 | Barndollar et al. |
| 2003/0105589 A1 | 6/2003 | Liu et al. |
| 2003/0182374 A1 | 9/2003 | Haldar |
| 2006/0029106 A1 | 2/2006 | Ott et al. |
| 2006/0150119 A1 | 7/2006 | Chesnais et al. |
| 2006/0156209 A1 | 7/2006 | Matsuura et al. |
| 2007/0030364 A1 | 2/2007 | Obrador et al. |
| 2007/0094217 A1 | 4/2007 | Ronnewinkel |
| 2007/0162942 A1 | 7/2007 | Hamynen et al. |
| 2007/0244980 A1 | 10/2007 | Baker et al. |
| 2008/0120371 A1 | 5/2008 | Gopal |
| 2009/0076795 A1 | 3/2009 | Bangalore et al. |
| 2009/0119584 A1 | 5/2009 | Herbst |
| 2009/0282114 A1 | 11/2009 | Feng et al. |
| 2010/0228590 A1 | 9/2010 | Muller et al. |
| 2010/0260426 A1 | 10/2010 | Huang et al. |
| 2011/0074685 A1 | 3/2011 | Causey et al. |
| 2011/0107223 A1 | 5/2011 | Tilton et al. |
| 2011/0164163 A1 | 7/2011 | Bilbrey et al. |
| 2011/0252108 A1 | 10/2011 | Morris et al. |
| 2011/0252207 A1 | 10/2011 | Janosik, Jr. et al. |
| 2012/0030289 A1 | 2/2012 | Buford et al. |
| 2012/0033876 A1 | 2/2012 | Momeyer et al. |
| 2012/0041941 A1 | 2/2012 | King et al. |
| 2012/0041973 A1 | 2/2012 | Kim et al. |
| 2012/0042036 A1 | 2/2012 | Lau et al. |
| 2012/0131520 A1 | 5/2012 | Tang et al. |
| 2012/0179717 A1* | 7/2012 | Kennedy ............. G06F 16/9535 707/772 |
| 2012/0224743 A1 | 9/2012 | Rodriguez et al. |
| 2012/0245944 A1 | 9/2012 | Gruber et al. |
| 2012/0278164 A1 | 11/2012 | Spivack et al. |
| 2013/0050507 A1 | 2/2013 | Syed et al. |
| 2013/0061148 A1 | 3/2013 | Das et al. |
| 2013/0073366 A1 | 3/2013 | Heath |
| 2013/0260727 A1 | 10/2013 | Knudson et al. |
| 2013/0262574 A1 | 10/2013 | Cohen |
| 2013/0346235 A1 | 12/2013 | Lam |
| 2014/0004889 A1 | 1/2014 | Davis |
| 2014/0035846 A1 | 2/2014 | Lee et al. |
| 2014/0047413 A1 | 2/2014 | Sheive et al. |
| 2014/0067371 A1 | 3/2014 | Liensberger |
| 2014/0088954 A1 | 3/2014 | Shirzadi et al. |
| 2014/0108562 A1 | 4/2014 | Panzer |
| 2014/0163954 A1 | 6/2014 | Joshi et al. |
| 2014/0164506 A1 | 6/2014 | Tesch et al. |
| 2014/0171133 A1 | 6/2014 | Stuttle et al. |
| 2014/0189027 A1 | 7/2014 | Zhang et al. |
| 2014/0189538 A1 | 7/2014 | Martens et al. |
| 2014/0201675 A1 | 7/2014 | Joo et al. |
| 2014/0228009 A1 | 8/2014 | Chen et al. |
| 2014/0237057 A1 | 8/2014 | Khodorenko |
| 2014/0317030 A1 | 10/2014 | Shen et al. |
| 2014/0337438 A1 | 11/2014 | Govande et al. |
| 2014/0372349 A1 | 12/2014 | Driscoll |
| 2015/0006143 A1 | 1/2015 | Skiba et al. |
| 2015/0032724 A1 | 1/2015 | Thirugnanasundaram et al. |
| 2015/0058720 A1 | 2/2015 | Smadja et al. |
| 2015/0095855 A1 | 4/2015 | Bai et al. |
| 2015/0100537 A1 | 4/2015 | Grieves et al. |
| 2015/0171133 A1 | 6/2015 | Kim et al. |
| 2015/0178371 A1 | 6/2015 | Seth et al. |
| 2015/0178388 A1 | 6/2015 | Winnemoeller et al. |
| 2015/0207765 A1 | 7/2015 | Brantingham et al. |
| 2015/0227797 A1 | 8/2015 | Ko et al. |
| 2015/0248411 A1 | 9/2015 | Krinker et al. |
| 2015/0250936 A1 | 9/2015 | Thomas et al. |
| 2015/0286371 A1 | 10/2015 | Degani |
| 2015/0288633 A1 | 10/2015 | Ogundokun et al. |
| 2015/0302301 A1* | 10/2015 | Petersen ............. G06N 5/04 706/11 |
| 2016/0037311 A1 | 2/2016 | Cho |
| 2016/0042252 A1 | 2/2016 | Sawhney et al. |
| 2016/0043974 A1 | 2/2016 | Purcell et al. |
| 2016/0072737 A1 | 3/2016 | Forster |
| 2016/0140447 A1 | 5/2016 | Cohen et al. |
| 2016/0140477 A1 | 5/2016 | Karanam et al. |
| 2016/0162791 A1 | 6/2016 | Petersen |
| 2016/0179816 A1 | 6/2016 | Glover |
| 2016/0210279 A1 | 7/2016 | Kim et al. |
| 2016/0224524 A1 | 8/2016 | Kay et al. |
| 2016/0226804 A1 | 8/2016 | Hampson et al. |
| 2016/0234553 A1 | 8/2016 | Hampson et al. |
| 2016/0283454 A1 | 9/2016 | Leydon et al. |
| 2016/0342895 A1 | 11/2016 | Gao et al. |
| 2016/0350304 A1 | 12/2016 | Aggarwal et al. |
| 2016/0378080 A1 | 12/2016 | Uppala et al. |
| 2017/0075878 A1 | 3/2017 | Jon et al. |
| 2017/0093769 A1 | 3/2017 | Lind et al. |
| 2017/0098122 A1 | 4/2017 | el Kaliouby et al. |
| 2017/0134316 A1 | 5/2017 | Cohen et al. |
| 2017/0142046 A1 | 5/2017 | Mahmoud et al. |
| 2017/0149703 A1 | 5/2017 | Willett et al. |
| 2017/0153792 A1 | 6/2017 | Kapoor et al. |
| 2017/0171117 A1 | 6/2017 | Carr et al. |
| 2017/0180276 A1 | 6/2017 | Gershony et al. |
| 2017/0180294 A1 | 6/2017 | Milligan et al. |
| 2017/0187654 A1 | 6/2017 | Lee |
| 2017/0250930 A1 | 8/2017 | Ben-Itzhak |
| 2017/0250935 A1 | 8/2017 | Rosenberg |
| 2017/0250936 A1 | 8/2017 | Rosenberg et al. |
| 2017/0293834 A1 | 10/2017 | Raison et al. |
| 2017/0308589 A1 | 10/2017 | Liu et al. |
| 2017/0324868 A1 | 11/2017 | Tamblyn et al. |
| 2017/0344224 A1 | 11/2017 | Kay et al. |
| 2017/0357442 A1 | 12/2017 | Peterson et al. |
| 2018/0004397 A1 | 1/2018 | Mazzocchi |
| 2018/0005272 A1 | 1/2018 | Todasco et al. |

(56) References Cited

U.S. PATENT DOCUMENTS

| | | |
|---|---|---|
| 2018/0012231 A1 | 1/2018 | Sapoznik et al. |
| 2018/0013699 A1 | 1/2018 | Sapoznik et al. |
| 2018/0032997 A1 | 2/2018 | Gordon et al. |
| 2018/0060705 A1 | 3/2018 | Mahmoud et al. |
| 2018/0083894 A1 | 3/2018 | Fung et al. |
| 2018/0083898 A1 | 3/2018 | Pham |
| 2018/0083901 A1 | 3/2018 | McGregor et al. |
| 2018/0090135 A1 | 3/2018 | Schlesinger et al. |
| 2018/0109526 A1 | 4/2018 | Fung et al. |
| 2018/0137097 A1 | 5/2018 | Lim et al. |
| 2018/0196854 A1 | 7/2018 | Burks |
| 2018/0210874 A1 | 7/2018 | Fuxman et al. |
| 2018/0293601 A1 | 10/2018 | Glazier |
| 2018/0309706 A1 | 10/2018 | Kim et al. |
| 2018/0316637 A1 | 11/2018 | Desjardins |
| 2018/0322403 A1 | 11/2018 | Ron et al. |
| 2018/0336226 A1 | 11/2018 | Anorga et al. |
| 2018/0336415 A1 | 11/2018 | Anorga et al. |
| 2018/0367483 A1 | 12/2018 | Rodriguez et al. |
| 2018/0367484 A1 | 12/2018 | Rodriguez et al. |
| 2018/0373683 A1 | 12/2018 | Hullette et al. |

FOREIGN PATENT DOCUMENTS

| | | |
|---|---|---|
| CN | 102395966 | 3/2012 |
| CN | 102467574 | 5/2012 |
| CN | 103548025 | 1/2014 |
| EP | 1376392 | 1/2004 |
| EP | 1394713 | 3/2004 |
| EP | 2523436 | 11/2012 |
| EP | 2560104 | 2/2013 |
| EP | 2688014 | 1/2014 |
| EP | 2703980 | 3/2014 |
| EP | 3091445 | 11/2016 |
| JP | 2000-298676 | 10/2000 |
| JP | 2002-132804 | 5/2002 |
| JP | 2014-86088 | 5/2014 |
| JP | 2014-142919 | 8/2014 |
| JP | 2015-531136 | 10/2015 |
| KR | 20110003462 | 1/2011 |
| KR | 20130008036 | 1/2013 |
| KR | 10-2013-0050871 | 5/2013 |
| KR | 20130061387 | 6/2013 |
| KR | 1020150037935 | 4/2015 |
| KR | 10-2015-0108096 | 9/2015 |
| KR | 10-2017-0032883 | 3/2017 |
| WO | 2004104758 | 12/2004 |
| WO | 2011002989 | 1/2011 |
| WO | 2016130788 | 8/2016 |
| WO | 2016/204428 | 12/2016 |
| WO | 2018089109 | 5/2018 |

OTHER PUBLICATIONS

USPTO, Notice of Allowance for U.S. Appl. No. 15/624,637, dated Apr. 19, 2019, 6 pages.
USPTO, Notice of Allowance for U.S. Appl. No. 15/350,040, dated Apr. 24, 2019, 16 pages.
USPTO, Notice of Allowance for U.S. Appl. No. 15/238,304, dated Apr. 5, 2019, 7 pages.
EPO, Communication Pursuant to Article 94(3) EPC for European Patent Application No. 16825663.4, dated Apr. 16, 2019, 5 pages.
EPO, Communication Pursuant to Article 94(3) EPC for European Patent Application No. 16825666.7, dated Apr. 23, 2019, 6 pages.
Notice of Acceptance for Australian Patent Application No. 2015214298, dated Apr. 20, 2018, 3 pages.
Examination Report No. 1 for Australian Patent Application No. 2015214298, dated Apr. 24, 2017, 3 pages.
Examination Report No. 2 for Australian Patent Application No. 2015214298, dated Nov. 2, 2017, 3 pages.
WIPO, International Search Report and Written Opinion for International Patent Application No. PCT/US2015/014414, dated May 11, 2015, 8 pages.
Blippar, "Computer Vision API", www.web.blippar.com/computer-vision-api, 4 pages.
Chen, et al., "Bezel Copy: An Efficient Cross-0Application Copy-Paste Technique for Touchscreen Smartphones.", Advanced Visual Interfaces, ACM, New York, New York, May 27, 2014, pp. 185-192.
CNIPA, First Office Action for Chinese Patent Application No. 201580016692.1, dated Nov. 2, 2018, 7 pages.
EPO, International Search Report and Written Opinion for PCT Application No. PCT/US2017/046858, dated Oct. 11, 2017, 10 Pages.
EPO, International Search Report and Written Opinion for International Patent Application No. PCT/US2016/068083, dated Mar. 9, 2017, 13 pages.
EPO, International Search Report for International Patent Application No. PCT/US2017/052713, dated Dec. 5, 2017, 4 Pages.
EPO, International Search Report for International Patent Application No. PCT/US2018/022501, dated May 14, 2018, 4 pages.
EPO, International Search Report for International Patent Application No. PCT/US2017/052349, dated Dec. 13, 2017, 5 pages.
EPO, International Search Report for International Patent Application No. PCT/US2017/057044, dated Jan. 18, 2018, 5 pages.
EPO, Written Opinion for International Patent Application No. PCT/US2017/052713, dated Dec. 5, 2017, 6 Pages.
EPO, International Search Report for International Patent Application No. PCT/US2018/022503, dated Aug. 16, 2018, 6 pages.
EPO, Written Opinion for International Patent Application No. PCT/US2017/052349, dated Dec. 13, 2017, 6 pages.
EPO, Written Opinion for International Patent Application No. PCT/US2018/022501, dated May 14, 2018, 6 pages.
EPO, Written Opinion of the International Preliminary Examining Authority for International Patent Application No. PCT/US2017/052713, dated Oct. 15, 2018, 6 pages.
EPO, Extended European Search Report for European Patent Application No. 15746410.8, dated Sep. 5, 2017, 7 pages.
EPO, Written Opinion for International Patent Application No. PCT/US2018/022503, dated Aug. 16, 2018, 8 pages.
EPO, Written Opinion of the International Preliminary Examination Authority for International Patent Application No. PCT/US2017/057044, dated Dec. 20, 2018, 8 pages.
EPO, Written Opinion for International Patent Application No. PCT/US2017/057044, dated Jan. 18, 2018, 8 pages.
EPO, Written Opinion of the International Preliminary Examining Authority for International Patent Application No. PCT/US2017/052349, dated Aug. 6, 2018, 9 pages.
Fuxman, Ariel, "Aw, so cute!": Allo helps you respond to shared photos, Google Research Blog, https://research.googleblog.com/2016/05/aw-so-cute-allo-helps-you-respond-to.html, May 18, 2016, 6 pages.
International Bureau of WIPO, International Preliminary Report on Patentability for International Patent Application No. PCT/US2016/068083, dated Jul. 5, 2018, 9 pages.
Kannan, et al., "Smart Reply: Automated Response Suggestions for Email", Proceedings of the 22nd ACM SIGKDD International Conference on Knowledge Discovery and Data Mining, KDD '16, ACM Press, New York, New York, Aug. 13, 2016, pp. 955-965.
Khandelwal, "Hey Allo! Meet Google's AI-powered Smart Messaging App", The Hacker News, http://web.archive.org/web/20160522155700/https://thehackernews.com/2016/05/google-allo-messenger.html, May 19, 2016, 3 pages.
KIPO, Preliminary Rejection for Korean Patent Application No. 10-20187013953, dated Oct. 29, 2018, 5 pages.
Lee, Jang Ho et al., "Supporting multi-user, multi-applet workspaces in CBE", Proceedings of the 1996 ACM conference on Computer supported cooperative work, ACM, Nov. 16, 1996, 10 pages.
Microsoft Corporation, "Windows Messenger for Windows XP", Retrieved from Internet: http://web.archive.org/web/20030606220012/messenger.msn.com/support/features.asp?client=0 on Sep. 22, 2005, Jun. 6, 2003, 3 pages.
PCT, "International Search Report and Written Opinion for International Application No. PCT/US2018/021028", dated Jun. 15, 2018, 11 Pages.
Pinterest, "Pinterest Lens", www.help.pinterest.com/en/articles/pinterest-lens, 2 pages.

(56) References Cited

OTHER PUBLICATIONS

Russell, "Google Allo is the Hangouts Killer We've Been Waiting For", Retrieved from the Internet: http://web.archive.org/web/20160519115534/https://www.technobuffalo.com/2016/05/18/google-allo-hangouts-replacement/, May 18, 2016, 3 pages.
USPTO, Notice of Allowance for U.S. Appl. No. 15/709,418, dated Mar. 1, 2018, 11 pages.
USPTO, Final Office Action for U.S. Appl. No. 15/238,304, dated Nov. 23, 2018, 14 pages.
USPTO, Notice of Allowance for U.S. Appl. No. 14/618,962, dated Nov. 8, 2016, 14 pages.
USPTO, Non-final Office Action for U.S. Appl. No. 15/709,418, dated Nov. 21, 2017, 15 pages.
USPTO, First Action Interview, Office Action Summary for U.S. Appl. No. 16/003,661, dated Dec. 14, 2018, 16 pages.
USPTO, Non-final Office Action for U.S. Appl. No. 15/238,304, dated Jun. 7, 2018, 17 pages.
USPTO, Notice of Allowance for U.S. Appl. No. 15/428,821, dated Jan. 10, 2018, 20 pages.
USPTO, Non-final Office Action for U.S. Appl. No. 14/618,962, dated Feb. 26, 2016, 25 pages.
USPTO, Notice of Allowance for U.S. Appl. No. 15/415,506, dated Jul. 23, 2018, 25 pages.
USPTO, Non-final Office Action for U.S. Appl. No. 15/428,821, dated May 18, 2017, 30 pages.
USPTO, First Action Interview, Pre-Interview Communication for U.S. Appl. No. 15/624,637, dated Oct. 19, 2018, 4 pages.
USPTO, First Action Interview, Office Action Summary for U.S. Appl. No. 15/350,040, dated Oct. 30, 2018, 4 pages.
USPTO, Non-final Office Action for U.S. Appl. No. 15/946,342, dated Jul. 26, 2018, 40 pages.
USPTO, First Action Interview, Pre-Interview Communication for U.S. Appl. No. 15/415,506, dated Apr. 5, 2018, 5 pages.
USPTO, First Action Interview, Office Action Summary for U.S. Appl. No. 15/624,637, dated Jan. 25, 2019, 5 pages.
USPTO, First Action Interview, Pre-Interview Communication for U.S. Appl. No. 15/350,040, dated Jul. 16, 2018, 5 pages.
USPTO, First Action Interview, Pre-Interview Communication for U.S. Appl. No. 15/386,760, dated Nov. 6, 2018, 5 pages.
USPTO, First Action Interview, Pre-Interview Communication for U.S. Appl. No. 16/003,661, dated Aug. 29, 2018, 6 pages.
USPTO, First Action Interview, Office Action Summary for U.S. Appl. No. 15/386,760, dated Jan. 30, 2019, 8 pages.
USPTO, Notice of Allowance for Design U.S. Appl. No. 29/503,386, dated Jul. 13, 2016, 8 pages.
USPTO, Non-final Office Action for Design U.S. Appl. No. 29/503,386, dated Feb. 1, 2016, 9 pages.
Vinyals, O. et al., "Show and Tell: A Neural Image Caption Generator", arXiv:1411.4555v2 [cs.CV], Apr. 20, 2015, pp. 1-9.
Yeh, et al., "Searching the web with mobile images for location recognition", Proceedings of the 2004 IEEE Computer Society Conference on Pattern Recognition, vol. 2, Jun.-Jul. 2004, pp. 1-6.
USPTO, Notice of Allowance for U.S. Appl. No. 15/624,638, dated Feb 28, 2019, 21 Pages.
KIPO, Notice of Preliminary Rejection for Korean Patent Application No. 10-2018-7019756, dated May 13, 2019, 9 pages.
EPO, Written Opinion of the International Preliminary Examining Authority for International Patent Application No. PCT/US2018/021028, dated Jun. 14, 2019, 11 pages.
USPTO, Final Office Action for U.S. Appl. No. 15/386,760, dated May 30, 2019, 13 pages.
KIPO, Notice of Final Rejection for Korean Patent Application No. 10-2018-7013953, dated Jun. 13, 2019, 4 pages.
KIPO, Notice of Preliminary Rejection for Korean Patent Application No. 10-2019-7011687, dated May 7, 2019, 3 pages.
KIPO, Notice of Final Rejection for Korean Patent Application No. 10-2018-7013953, dated May 8, 2019, 4 pages.
USPTO, Notice of Allowance for U.S. Appl. No. 16/003,661, dated May 1, 2019, 11 pages.
USPTO, Non-final Office Action for U.S. Appl. No. 15/709,423, dated May 2, 2019, 21 Pages.
JPO, Office Action for Japanese Patent Application No. 2018-551908, dated Aug. 20, 2019, 4 pages.
Chen, et al., "A Survey of Document Image Classification: problem statement, classifier architecture and performance evaluation", International Journal of Document Analysis and Recognition (IJDAR), vol. 10, No. 1, Aug. 3, 2006, pp. 1-16.
International Bureau of WIPO, International Preliminary Report on Patentability for International Patent Application No. PCT/US2017/057044, dated Jul. 30, 2019, 9 pages.
JPO, Office Action for Japanese Patent Application No. 2018-532399, dated Jul. 23, 2019, 6 pages.
KIPO, Notice of Allowance for Korean Patent Application No. 10-2019-7011687, dated Sep. 26, 2019, 4 pages.
KIPO, Notice of Preliminary Rejection for Korean Patent Application No. 10-2019-7024479, dated Sep. 18, 2019, 9 pages.
Lardinois, F. "Allo brings Google's smarts to messaging", https://techcrunch.com/2016/09/20/allo-brings-googles-smarts-to-messaging/, Sep. 2016, 14 pages.
USPTO, Non-final Office Action for U.S. Appl. No. 15/386,760, dated Oct. 11, 2019, 12 pages.
USPTO, Notice of Allowance for U.S. Appl. No. 15/709,423, dated Oct. 9, 2019, 19 pages.

* cited by examiner

AUTOMATIC SUGGESTIONS FOR MESSAGE EXCHANGE THREADS

BACKGROUND

Mobile is clearly overtaking desktop for user attention. Chat is where users spend a lot of their time or maybe most of their time on their mobile devices. In the meantime, as the contact lists of users become larger and larger or even unmanageable in social networks, users get increasingly worried about privacy and start to move more and more information sharing to chat conversations. As a result, more of the information we care about is now contained in our conversations. An approach to handle conversations in a more intuitive and efficient way is desirable.

Users share a lot of information every day, for example, times, locations, places, people, events, videos. However, most of the information they share is static. Users need to go somewhere else to get more information or complete an action. For example, users are talking about going to a theater to watch a movie, but need to check the website of the theater to book tickets.

Users reply to messages either by typing, which can be especially hard on a touch screen of a mobile device, or by copying and pasting from other places where users find answers. Neither provides a good experience for user reply.

Users lose track of things they share in conversations. The conversations may not be easily searchable, for example, a user may need to scroll up and down from a lot of search results to find a piece of information the user really wants.

Additionally, there is no easy way to gain insights from conversations, to gauge context or sentiment, for example. There is also no information feed from a conversation to a different application.

SUMMARY

The present disclosure relates to systems and methods for identifying an entity from a message exchange thread (also referred to herein as a "conversation"), and generating a suggestion for presentation to participant(s) of the conversation via computing device(s) of the participant(s), where the suggestion is a suggestion for the participant(s) to take an action on the entity. In some implementations, an entity is a thing or a concept that is singular, well-defined, and distinguishable. For example, an entity may be a person, place, item, idea, or any combination thereof.

In some implementations, the suggestion is directed toward the entity based on identifying the entity from one or more messages of the message exchange thread. In some of those implementations, one or more contextual indicators of the entity are also determined, the contextual indicators are utilized to determine whether the entity is actionable, and the suggestion is provided for presentation to participant(s) only when it is determined that the entity is actionable. The entity may be determined to be actionable by determining whether the entity is, in a context of the message exchange thread, where a user is going to take an action on the entity. Various contextual indicators may be utilized such as contextual indicators that are based on content external to the message exchange thread itself (e.g., prior electronic messages of participants in prior message exchange threads), contextual indicators that are based on natural language processing of message(s) (of the message exchange thread and/or prior message exchange thread(s)), contextual indicators that are based on conversation flow of the message exchange thread, contextual indicators that are based on sentiment determined based on message(s) (of the message exchange thread and/or prior message exchange thread(s)), etc. Additional and alternative contextual indicators are described in more detail herein. Providing suggestions only when it is determined (based on contextual indicators) that the entity is actionable may prevent participant(s) from being distracted by irrelevant suggestions and/or may conserve various computational resources by not transmitting and/or providing for presentation, irrelevant suggestions. For instance, suggestions may be provided only when they are determined to be contextually relevant, which, when compared to providing suggestions without regard to contextual relevance, may lead to a decrease in the providing of suggestions and a corresponding conservation of computational resources. Also, some implementations of providing suggestions according to techniques described herein may be of particular benefit to users that have low dexterity, or users who otherwise have difficulties making user inputs to a device. For at least these users, the incorporation of the selectable suggestions into the message exchange thread may increase the reliability and speed of use of the device, e.g. by saving the user making errors due to low dexterity.

In some implementations, the suggestion is a selectable suggestion. In some of those implementations, in response to selection of the suggestion by a participant of the conversation, the suggestion (and/or related content) may be incorporated into a transcript of the conversation and/or a computer-based action directed toward the entity may be performed (e.g., within the message exchange thread and/or separate from the message exchange thread). For example, the suggestion may initially be provided as a non-static graphical element for presentation to one or more of the participants and, only upon selection of the suggestion by one or more of the participants, is the suggestion (and/or related content) statically incorporated into a transcript of the conversation. For instance, once statically incorporated the suggestion may form part of the transcript and continue to be viewed (e.g., by scrolling) in the conversation even after further messages have been submitted for inclusion in the transcript of the conversation. Also, for instance, once statically incorporated the suggestion may be indexed in association with the conversation enabling participants to search for the conversation in the future based on the suggestion. In some implementations where the suggestion is selectable, it may include an affirmative interface element and a negative interface element. In response to selection(s) of the affirmative interface element, the suggestion may be incorporated in the transcript and in response to selection(s) of the affirmative interface element the suggestion may be discarded without static incorporation of the suggestion into the transcript.

In some implementations, providing contextually relevant suggestions during an ongoing message exchange thread may enable participants to add the suggestions (or related content) to the message exchange thread in a simple manner (e.g., via a single-tap and/or other single selection interface action). Additionally or alternatively, contextually relevant suggestions may provide participant(s) with content that is directed to a contextually relevant entity, without requiring the participant(s) to switch from an application rendering the message exchange thread to another application in order to acquire such content. For example, providing a suggestion for presentation via a message exchange client and/or incorporating content based on the suggestion (e.g., in response to a user selection of the suggestion) into a transcript of a message exchange thread may obviate the need to switch from the message exchange client to acquire such content.

This may reduce the use of certain computational resources that would otherwise be consumed in switching to another application to satisfy the informational needs. For example, switching to another application may require usage of processor, memory, and/or battery resources via launching and/or surfacing of the application. Further, switching to another application to obtain content in lieu of obtaining the content in a message exchange thread may increase the amount of time a participant needs to spend obtaining the content—which may lead to a corresponding increase in consumption of computational resources in obtaining the content.

Moreover, in implementations where participant(s) are presented with the option of whether to statically incorporate a suggestion in a transcript of a conversation, the participant(s) may be presented with contextually relevant suggestions, but still be allowed to control whether those suggestions form part of the conversation. This may mitigate clutter in user interfaces that render message exchange threads and/or may reduce usage of various computational resources (e.g., reduce storage space required to index or otherwise store a transcript of a message exchange thread since all suggestions are not automatically stored).

In some implementations, a method implemented by one or more processors is provided and includes receiving an electronic message submitted by a first user for display in a transcript of a message exchange thread. The electronic message is submitted in response to user interface input provided by the first user via a client device of the first user. The message exchange thread is between at least the first user and a second user via a first message exchange client of the first user and a second message exchange client of the second user. The method further includes: identifying an entity from the electronic message, determining contextual indicators of the entity, and determining whether the entity is actionable based on the contextual indicators. The method further includes, responsive to determining that the entity is actionable: providing, for presentation via at least one of the first message exchange client and the second message exchange client, a suggestion that is directed to the entity.

These and other implementations may optionally include one or more of the following features.

In some implementations, responsive to determining that the entity is actionable, the suggestion is provided for presentation to the second user via the second message exchange client, but is not provided to the first user. In some of those implementations, the method further includes: receiving an affirmative selection of the suggestion by the second user via the second message exchange client; and responsive to the affirmative selection, providing content based on the suggestion for presentation to the first user via the first message exchange client. In some versions of those implementations, the content based on the suggestion is the suggestion itself. Some of these implementations thus only initially present a subset of participants of a message exchange thread with a suggestion, and further only present content based on that suggestion to other participant(s) not of the subset in response to affirmative selection of the suggestion by participant(s) of the subset. This may prevent consumption of various computational resources of client devices of the other participant(s) not of the subset by preventing provision of suggestions and/or content in situations where affirmative selection is not provided.

In some implementations, responsive to determining that the entity is actionable the suggestion is provided for presentation without incorporation of the suggestion in the transcript of the message exchange thread. In some of those implementations, the method further includes: receiving an affirmative selection of the suggestion; and responsive to the affirmative selection, incorporating content that is based on the suggestion in the transcript of the message exchange thread. Some of these implementations thus only incorporate, into a transcript of a message exchange thread, content that is based a suggestion in response to affirmative selection of the suggestion. This may prevent consumption of various computational resources, such as resources required to store the transcript and/or resources required to provide and/or render the content in the message exchange thread.

In some implementations, responsive to determining that the entity is actionable the suggestion is provided for presentation without incorporation of the suggestion in the transcript of the message exchange thread, and the suggestion includes an affirmative interface element and a negative interface element. In some of those implementations, the method further includes: monitoring for selection of either the affirmative interface element or the negative interface element; and incorporating content that is based on the suggestion in the transcript of the message exchange thread only in response to selection of the affirmative interface element. Some of these implementations thus only incorporate, into a transcript of a message exchange thread, content that is based a suggestion in response to affirmative selection of the suggestion. This may prevent consumption of various computational resources, such as resources required to store the transcript and/or resources required to provide and/or render the content in the message exchange thread.

In some implementations, the method further includes: responsive to determining that the entity is actionable: transmitting the entity to a third-party server; and receiving the suggestion from the third-party server in response to transmitting the entity.

In some implementations, determining the contextual indicators includes determining at least one contextual indicator based on a separate prior message exchange thread that involves at least one of the first user and the second user. In some of those implementations, the at least one contextual indicator is based on sentiment expressed by at least one of the first user and the second user in one or more prior messages of the prior message exchange thread. In some versions of those implementations, the sentiment is directed to the entity and determining the at least one contextual indicator includes determining the at least one contextual indicator based on the sentiment being directed to the entity.

In some implementations, determining the contextual indicators includes determining at least one contextual indicator based on performing a sentiment analysis of a prior message of the first user or the second user. The prior message is in the message exchange thread or in a prior message exchange thread. In some of those implementations, performing the sentiment analysis is based at least in part on a non-textual graphical element included in the prior message. In some versions of those implementations, the prior message is in the prior message exchange thread and the at least one contextual indicator is selected based on the sentiment being directed toward the entity in the prior message.

In some implementations, the suggestion is provided for presentation to the second user and the contextual indicators are based on a prior message of the first user. In some of those implementations, the prior message is submitted by the first user in a prior message exchange thread that does not involve the second user.

In some implementations, the method further includes performing natural language analysis on the at least one electronic message based on a machine learning model, and identifying the entity that is actionable from the electronic message and determining the contextual indicators of the entity are based on the natural language analysis.

In some implementations, the method further includes tracking conversation flows from each participant of the message exchange thread to create tracking information, and generating the contextual indicators based on the tracking information.

In some implementations, the method further includes determining the suggestion using a trained machine learning model and the contextual indicators. In some of those implementations, the method further includes: receiving a user reaction to the suggestion provided for the entity; generating a training example with training example input based on the contextual indicators and with training example output based on the user reaction; and revising the trained machine learning model based on further training the trained machine learning model based on the training example.

In some implementations, the method further includes indexing, in a computer readable medium, the message exchange thread based on the contextual indicators.

Other implementations these and other methods may include corresponding systems, apparatus, and computer programs, configured to perform the actions of the methods, encoded on computer storage devices.

In general, other implementations of the subject matter described in this disclosure may be embodied in methods that include receiving, using one or more processors, at least one conversation message from a conversation, identifying, using one or more processors, an entity that can be actionable from a conversation message, determining, using one or more processors, contextual indicators of the entity, determining, using one or more processors, whether the entity is actionable based on the contextual indicators, and responsive to the entity being actionable, providing a suggestion to a user to take an action on the entity.

These and other implementations may each optionally include one or more of the following features. For instance, the features may include performing a natural language analysis on the at least one conversation message based on a machine learning model and wherein identifying the entity that can be actionable from the conversation message and determining the contextual indicators of the entity are based on the analysis. The features may include tracking conversation flows from each participant of the conversation and refining the contextual indicators based on the tracking information. The features may include determining the suggestion for the user to take an action on based on a machine learning model and the contextual indicators. The features may include receiving, from the user, an indication to mark the entity as actionable, sending the user indication as a training signal to a machine learning model, searching for information relevant to the entity and providing the information to the user. The features may include receiving data from a variety of sources including queries and document retrievals, extracting features from the data, generating a machine learning model based on the extracted features, receiving a user action, the user action including a reaction to the suggestion provided for the entity, and training the machine learning module based on the user action. The features may include feeding entity information to an application, the entity information including participants of the conversation, generating the suggestion by the application and providing the suggestion to the participants of the conversation. The features may include detecting a question for the user in the conversation, the question being related to the entity, determining a potential user reply to the question, and providing the potential user reply in a one-tap form to the user. The features may include organizing the at least one conversation based on the contextual indicators and indexing the at least one conversation.

Other implementations these and other methods may include corresponding systems, apparatus, and computer programs, configured to perform the actions of the methods, encoded on computer storage devices.

Some of the above and/or other implementations may be advantageous in a number of respects. For instance, a suggestion may be generated based on a machine learning model that learns over time to understand the semantics of a conversation and derives meaning from the real time conversation, and is therefore efficient and accurate. The suggestion may also generated based on contextual analysis including sentiment analysis and conversation flows. An appropriate suggestion is generated under an appropriate contextual condition, and is therefore intelligent. For example, no celebration message will be sent to a sad user. Moreover, the suggestion may offer rich context and next step(s) that can be directly used for a user to complete an action. Further, important suggestions and updates may be provided by other services in one place for all participants of a conversation. Also the organization and summarization mechanism may allow users to easily look back at a meaningful trail of information shared in conversations.

It should be understood, however, that the above features and advantages are not all-inclusive and many additional features and advantages are contemplated and fall within the scope of the present disclosure. Moreover, it should be understood that the language used in the present disclosure has been principally selected for readability and instructional purposes, and not to limit the scope of the subject matter disclosed herein.

BRIEF DESCRIPTION OF THE DRAWINGS

The specification is illustrated by way of example, and not by way of limitation in the figures of the accompanying drawings in which like reference numerals are used to refer to similar elements.

DETAILED DESCRIPTION

Figure 1:
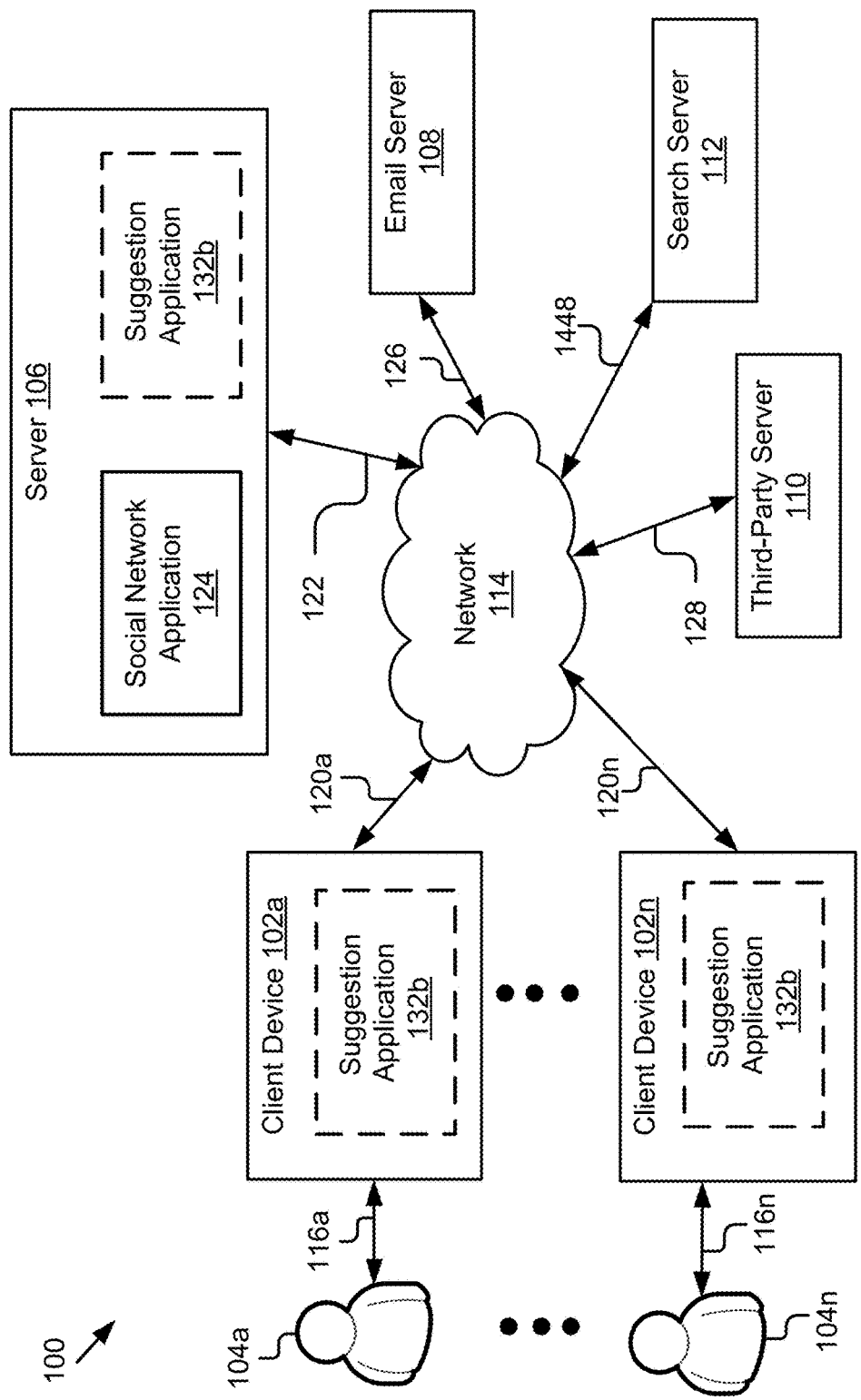
FIG. 1 is a block diagram illustrating an example system for identifying an entity from a conversation and generating a suggestion for a user to take an action on the entity.

Systems, methods and interfaces for automatic suggestion generation are disclosed. In some implementations, the systems, methods and interfaces for automatic suggestion generation are based on conversation analysis. When a user sends a message in a conversation, the message is analyzed to determine one or more entities that a user can take an action on. Other messages of the conversation or even other conversations involving the user and/or other participant(s) of the conversation are then analyzed to determine the contextual indicators. A suggestion is generated based on the contextual indicators. For example, if two users want to meet at a store, a map and a calendar could be suggested to direct the users to the store and set up a meeting time. Based on the contextual indicators, the map may only indicate directions to a particular store close to both users, and the calendar may highlight the available time of both users. In some instances, the suggestion offers next steps of the action.

The suggestion generation process is automatic in many aspects. For example, implementations of the present disclosure determine whether to generate a suggestion, and: when and where in the conversation to insert the suggestion; and/or when to recommend the suggestion to one or more participants for potential insertion in the conversation. For instance, for a question "meet at coffee house?" from user A to user B, a map that includes the coffee house may be suggested to one or both of the two users if user B answers "great!" to the question, while the map suggestion will not be provided to either of the two users if user B answers "I'd like to go, but . . . " In some implementations, different versions of the suggested map may be provided to each of the users, such as a first version provided to the first user with directions to the coffee house from the first user's current location and a second version provided to the second user with directions to the coffee house from the second user's current location. Implementations of the present disclosure also determine what suggestion is appropriate, and/or when it is appropriate to provide the suggestion, based on contextual indicators. For example, if a user just received bad news (e.g., as determined based on analysis of another conversation of the user), it may be determined that a celebration suggestion is inappropriate for providing to the user in a conversation. As another example, if it is determined a user hates something (e.g., based on sentiment expressed by the user about such thing in the conversation and/or a prior conversation), it may be determined that a suggestion of such thing is not appropriate for providing to the user in the conversation.

While the systems, methods and interfaces of the present disclosure are now described in the context of a client-server system, it should be understood that the systems, methods and interfaces can be applied to systems other than a single client-server system operably connected over a network. For example, client devices, a third-party server, an email server, and/or a server where a suggestion application is stored may provide some or all of the functionality described herein and may employ a cluster of servers in order to provide such functionality. As an additional example, client hardware may be a mobile phone or tablet device.

Turning now to the figures, FIG. 1 illustrates a block diagram of a system 100 for identifying an entity from a conversation and generating a suggestion for a user to take an action on the entity. The illustrated system 100 includes client devices 102a, 102n that are accessed by users 104a, 104n, a server 106, an email server 108, a third-party server 110 and a search server 112. In the illustrated example, these entities are communicatively coupled via a network 114. In FIG. 1 and the remaining figures, a letter after a reference number, for example, "102a" is a reference to the element having that particular reference number. A reference number in the text without a following letter, for example, "102" is a general reference to different instances of the element bearing that reference number. Although only two client devices 102a, 102n are illustrated, persons of ordinary skill in the art will recognize that arbitrary number of client devices 102n is available to arbitrary number of users 104n.

The network 114 can be a conventional type, wired or wireless, and may have numerous different configurations including a star configuration, token ring configuration or other configurations. Furthermore, the network 114 may include a local area network (LAN), a wide area network (WAN) (e.g., the Internet), and/or other interconnected data paths across which multiple devices may communicate. In some instances, the network 114 may be a peer-to-peer network. The network 114 may also be coupled to or includes portions of a telecommunications network for sending data in a variety of different communication protocols. In some other instances, the network 114 includes Bluetooth communication networks or a cellular communications network for sending and receiving data including via short messaging service (SMS), multimedia messaging service (MMS), hypertext transfer protocol (HTTP), direct data connection, Wireless Application Protocol (WAP), email, etc. Although FIG. 1 illustrates one network 114 coupled to the client devices 102a, 102n, the email server 108, the third-party server 110 and the search server 112, in practice one or more networks 114 can be connected to these entities.

The client devices 102a, 102n in FIG. 1 are used by way of example. Although only two client devices 102 are illustrated, the disclosure applies to a system architecture having any number of client devices 102. In the illustrated implementation, the users 104a, 104n interact with the client device 102a, 102n via signal line 116a, 116n respectively. The client devices 102a, 102n are communicatively coupled to the network 114 via signal line 120a, 120n respectively, and exchange information with the server 106, the email sever 108, the third-party server 110 and the search server 112. For example, the client device 102a sends a conversation message (also referred to herein as an "electronic message") to the server 106. The server 106 processes the conversation message and generates a suggestion based on the conversation message. In some instances, the server 106 receives one or more conversation messages and generates the suggestion based on the one or more conversation messages. In other instances, the server 106 also uses other inputs (e.g., prior user activities, user profile information, etc.) to generate the suggestion. Authorization is obtained prior to the use of any profile information or personal information of the user. The client device 102a receives the suggestion without unintended delays from the server 106. For example, the client device 102 receives a suggestion including an arrival time and a status of a flight right after sending a message "has John's flight landed?" In some instances, a delay may be desirable, for example, when a suggestion best fits at a future time in the conversation or when the server 106 waits for more conversation messages for context and confirmation to send the suggestion. For example, when the client device 102a sent a message "let's grab coffee" to the client device 102n, rather than instantly suggesting a map of coffee shops, the server 106 may wait for a message from the client device 102n (e.g., "I hate coffee") before generating and/or providing the suggestion.

In some instances, the client device 102 can be any computing device that includes a memory and a processor. For example, the client device 102 can be a laptop computer, a desktop computer, a tablet computer, a mobile telephone, a personal digital assistant, a mobile email device, a portable game player, a portable music player, a television with one or more processors embedded therein or coupled thereto or any other electronic device capable of accessing the network 114, etc.

The server 106 can be a hardware server that includes a processor, a memory and network communication capabilities. The server 106 is communicatively coupled to the network 114 via signal line 122. In some instances, the server 106 sends and receives data to and from one or more of the client devices 102, the email server 108, the third-party server 110 and the search server 112 via the network 114. The server 106 optionally includes a social network application 124.

A social network can be a network where the users may be connected by common feature(s). The common feature(s) may include relationships/connections, e.g., friendship, family, work, an interest, etc. The common feature(s) may be provided by one or more social networking systems including explicitly defined relationships and relationships implied by social connections with other online users, where the relationships form a social graph. In some examples, the social graph can reflect a mapping of these users and how they can be related. The social network application 124 in the server 106 manages the social network by handling registration of users, publication of content (e.g. posts, comments, photos, links, check-ins, etc.), hosting multi-user communication sessions, managing of groups, managing different sharing levels, updating the social graph, etc. The social network application 124 registers a user by receiving information such as a username and password and generates a user profile that is associated with the user and stored as part of the social graph. In some instances, the user profile includes additional information about the user including interests (e.g. soccer, reading, food, subscriptions, etc.), activities (e.g. search history, indications of approval, posts, comments, multi-user communication sessions, etc.), demographics (e.g. age, ethnicity, location, etc.) and profile rating and reputation (e.g., intelligence rating, humor rating, etc.). The system 100 may include multiple servers 106 that include traditional social network servers, email servers, micro-blog servers, blog servers, forum servers, message servers, etc.

Furthermore, the server 106 and the social network application 124 may be representative of one social network. There may be multiple social networks coupled to the network 114, each having its own server, application and social graph. For example, a first social network may be more directed to business networking, a second may be more directed to or centered on academics, and a third may be more directed to local business.

The email server 108 can be a hardware server that includes a processor, a memory and network communication capabilities. The email server 108 is communicatively coupled to the network 114 via signal line 126. In some instances, the email server 108 exchanges user data with the server 106 so that the server 106 can generate a suggestion for an entity in a conversation message based on the user data. For example, when a user talks about buying a toy in a conversation, the server 106 can communicate with the email server 108 to get the user's purchase history (e.g., from purchase receipts for toys in emails), and determines a suggestion based at least in part on the purchase history. Authorization is obtained prior to the use of any purchase history or other personal information of the user.

The third-party server 110 can be a computing device that includes a processor, a memory and network communication capabilities. The third-party server 110 is coupled to the network 114 via signal line 128. The third-party server 110 sends and receives data to and from the client device 102, the server 106 and the search server 112 of the system 100 via the network 114. The third-party server 110 may store different applications. For example, the server 106 can receive conversation messages from a conversation application stored on the third-party server 110. In another example, the server 106 feeds entity information to an application stored on the third-party server 110 (e.g., via an application programming interface (API) of the third-party server 110) so that the application can generate a suggestion based on the entity information. Multiple third-party servers may be provided and the server 106 may select an appropriate third-party server (for providing entity information and receiving a responsive suggestion) based on various factors. For example, a semantic type of the entity and/or action(s) mentioned in association with the entity in a conversation may be utilized to select a given third-party server in lieu of other available third-party servers. For instance, third-party server 110 may provide suggestions for restaurant reservations and may be selected based on an entity being of a "restaurant" semantic type and/or based on "reserve", "book", and/or other "reservation" terms being mentioned in association with the entity. Moreover, in some implementations contextual indicators described herein may be utilized to determine whether an entity is actionable, and the server 106 may optionally provide entity information to a third-party server only when it is determined the entity is actionable. This may reduce network traffic by preventing some transmissions of entity information for an entity to a third-party server when the entity is not deemed actionable.

The search server 112 can be a computing device that includes a processor, a memory and network communication capabilities. The search server 112 is coupled to the network 114 via signal line 130. The search server 112 includes a search engine that provides a search result to a user responsive to a search request from the user. In some instances, the server 106 communicates with the search server 112 to search for information related to an entity and generates a suggestion to take an action on the entity based on the information returned by the search server 112 in response to the searching.

In some instances, the server 106 comprises a suggestion application 132b. In other instances, the suggestion application 132b may additionally or alternatively be stored on the client device 102. For example, the suggestion application 132b may be a thin-client application that includes part of the suggestion application 132b on the client device 102 and part of the suggestion application 132b on the server 106 to identify an entity from a conversation and generate a suggestion for a user to take an action on the entity.

The suggestion application 132b receives at least one conversation message from a conversation and identifies an entity from a conversation message. An entity can be a portion of a conversation message, for example, a person or an object in the conversation message. In some instances, the suggestion application 132b parses a conversation message based on analyzing the grammatical constituents of the conversation message and identifies one or more entities from the parsed conversation message. For example, the suggestion application 132b identifies that the message "great weather!" includes "great," "weather" and '!' based on parsing the message, and determines a first entity "great" and a second entity "weather" from the message.

In some implementations, the suggestion application 132b further extends the analysis to the entire conversation or even other conversations (e.g., previous conversations, conversations from a third-party application) to determine contextual indicators. For example, from the message "would you like to meet at ABC coffee store?" and user profile information, the suggestion application 132b determines that an entity "ABC coffee store" is near the user's office. Authorization is obtained prior to the use of any profile information or personal information of the user. Other contextual indicators include sentiment indicators, conversation flows, tense of the message, recency of the message, the day and/or time at which the message was sent, the day and/or time associated with the entity, conversation metadata, etc.

In some implementations, the suggestion application 132b further determines whether an entity is actionable based on determining whether the entity is in a context of conversation where a user is going to take an action on the entity. For example, the suggestion application 132b determines the A entity in the message "I like A" is non-actionable, but determines that the A entity in the message "I am going to buy A" is actionable. The suggestion application 132b determines whether an entity is actionable based on contextual indicators including conversation flows, tense, sentiment indicators (e.g., based on an emotion symbol), verbs used in the message, whether a question is asked in the message, conversation metadata, etc. If user A asks user B "meet at XYZ?," the suggestion application 132b will only determine that the location "XYZ" is actionable after receiving user B's positive answer in the conversation flow.

In some implementations, the suggestion application 132b generates a suggestion for an actionable entity based on contextual indicators. For example, the suggestion application 132b uses the messages "I hate A restaurant," "I like B restaurant," "C restaurant is ok" from a first user as contextual indicators to determine a suggestion B when a second user invites the first user to go to dinner. For example, the suggestion may be directed to B restaurant and/or C restaurant, but not A restaurant, based on the corresponding sentiments expressed with respect to each of those entities in the messages. As described herein, the messages may be from the conversation in which the second user invites the first user to go to dinner and/or may be from other conversations, that may or may not include the second user. Further, and as also described herein, the suggestion B determined based on the first user's messages may be provided for presentation to the first user and/or the second user (if appropriate authorization is obtained). In other words, in some implementations the suggestion B may be generated based on the first user's messages, and provided for presentation to the second user. In some of those implementations, the suggestion based on the first user's messages may only be provided to the second user if it is determined the first user's messages are from conversation(s) that also included the second user. In some other implementations, the suggestion based on the first user's messages may be provided to the second user even if one or more of the first user's messages are from conversation(s) that do not include the second user.

In addition, in some implementations the suggestion application 132b may feed entity information to a separate application (e.g., hosted by third-party server 110) and, in response, get a suggestion from the separate application. Feeding entity information to a separate application may include transmitting the entity information to the separate application utilizing one or more networks, and optionally utilizing an API of the separate application. Receiving a suggestion in response to feeding the entity information may include receiving the suggestion over one or more networks in response to transmitting the entity information, and may optionally utilize an API (e.g., the same API utilized in transmitting the entity information).

As one example, if a user mentions weather in a conversation with other users, a weather service may send an hourly weather report to the users. For instance, the hourly weather report may be incorporated into a transcript of the conversation for viewing by all of the users and/or may be provided to the users via separate applications than the message exchange clients/applications utilized to engage in the conversation. In this way, the suggestion application 132b connects users with the separate application without the users manually installing the separate application on a client device and provides important suggestions in a place for presentation to all participants of a conversation (e.g., in a transcript of the conversation). In some instances, the suggestion application 132b additionally or alternatively predicts a possible reply for a user to answer a question in a conversation, and so saves the user time. In other instances, the suggestion application 132b additionally or alternatively organizes information of a conversation so that users can easily reference back to any information they want in the conversation. Various implementations of the suggestion application 132b are discussed in further detail herein, e.g. with reference to FIG. 2.

Figure 2:
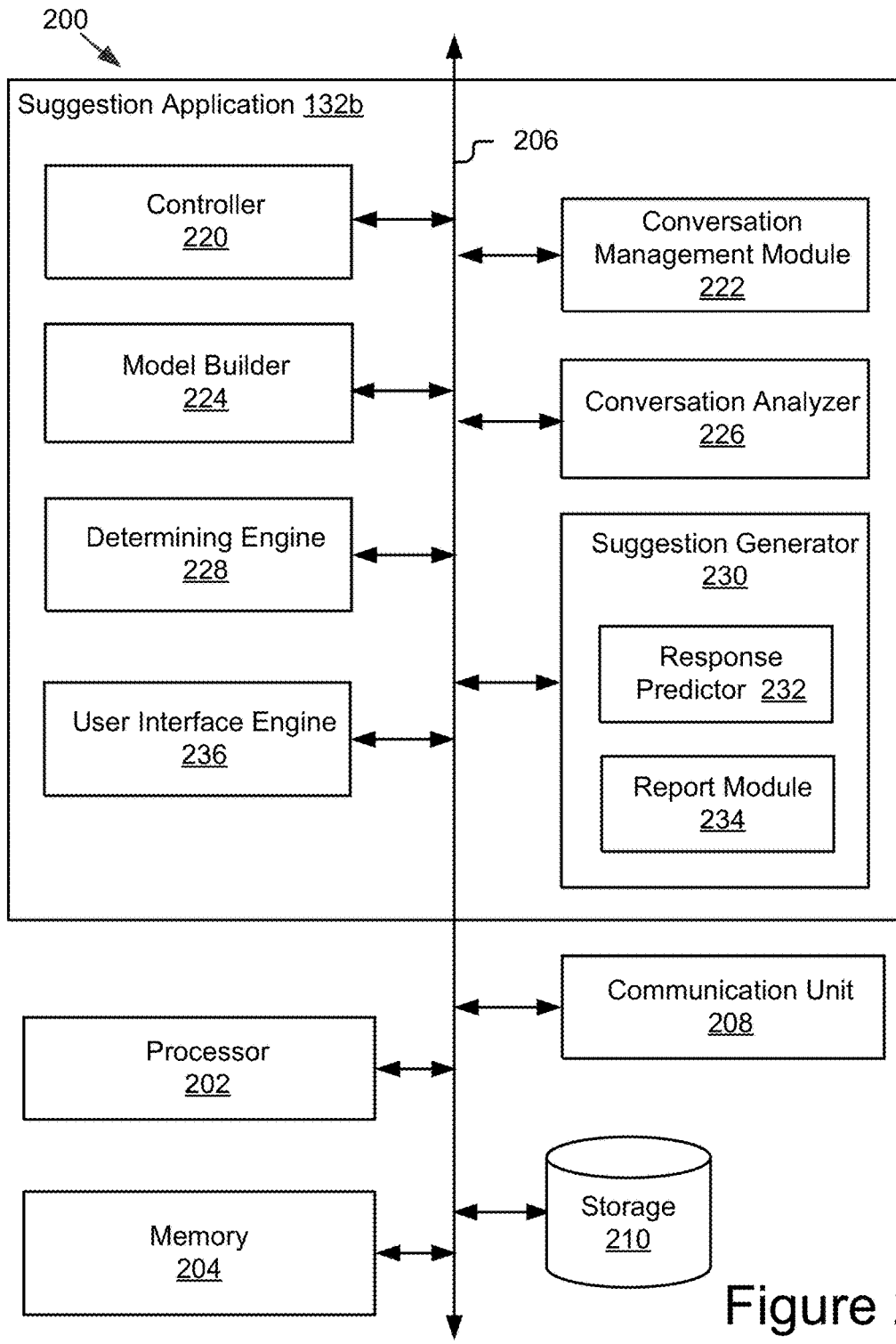
FIG. 2 is a block diagram illustrating an example suggestion application.

Referring now to FIG. 2, an example of the suggestion application 132b is shown in more detail. FIG. 2 is a block diagram of a computing device 200 that includes a processor 202, memory 204, a communication unit 208, a storage 210 and a suggestion application 132b according to some implementations. In some instances, the computing device 200 is a server 106. In other instances, the computing device is a client device 102. In yet other instances, the computing device is a distributed computing device such as one that operates on both server 106 and client device 102. The components of the computing device 200 are illustrated in FIG. 2 as communicatively coupled by a bus 206.

The processor 202 includes some or all of an arithmetic logic unit, a microprocessor, a general purpose controller or some other processor array to perform computations and provide electronic display signals to a display device. The processor 202 is coupled to the bus 206 for communication with the other components. Processor 202 processes data signals and may include various computing architectures including a complex instruction set computer (CISC) architecture, a reduced instruction set computer (RISC) architecture, or an architecture implementing a combination of instruction sets. Although FIG. 2 includes a single processor, multiple processors may be included. The processing capability may be limited to supporting the display of images and the capture and transmission of images. The processing capability might be enough to perform more complex tasks, including various types of feature extraction and sampling. It will be obvious to one skilled in the art that other processors, operating systems, sensors, displays and physical configurations are possible.

The memory 204 stores instructions and/or data that may be executed by processor 202. The memory 204 is coupled to the bus 206 for communication with the other components. The instructions and/or data may include code for performing any and/or all of the techniques described herein. The memory 204 may be a dynamic random access memory (DRAM) device, a static random access memory (SRAM) device, flash memory or some other memory device known in the art. In some instances, the memory 204 also includes a non-volatile memory or similar permanent storage and media, for example, a hard disk drive, a floppy disk drive, a CD-ROM device, a DVD-ROM device, a DVD-RAM device, a DVD-RW device, a flash memory device, or some other mass storage known in the art for storing information on a more permanent basis.

The communication unit 208 transmits and receives data to and from at least one of: the client devices 102, the server 106, the email server 108, the third-party server 110, and the search server 112. The communication unit 208 is coupled to the bus 206. For example, the communication unit 208 receives data including a conversation message from the client device 102 and transmits the data to the server 106. The server 106 generates a suggestion based on the conversation message using a suggestion application 132b stored on the server 106 and transmits the suggestion to the client device 102.

In some instances, the communication unit 208 includes a port for direct physical connection to the client device 206 or to another communication channel. For example, the communication unit 208 includes an RJ45 port or similar port for wired communication with the client device 206. In other instances, the communication unit 208 includes a wireless transceiver (not shown) for exchanging data with the client device 206 or any other communication channel using one or more wireless communication methods, such as IEEE 1502.11, IEEE 1502.16, Bluetooth® or another suitable wireless communication method.

In some other instances, the communication unit 208 includes a cellular communications transceiver for sending and receiving data over a cellular communications network such as via short messaging service (SMS), multimedia messaging service (MMS), hypertext transfer protocol (HTTP), direct data connection, wireless application protocol (WAP), e-mail or another suitable type of electronic communication. In still another instance, the communication unit 208 includes a wired port and a wireless transceiver. The communication unit 208 also provides other conventional connections to the network 114 for distribution of files and/or media objects using standard network protocols such as TCP/IP, HTTP, HTTPS and SMTP as will be understood to those skilled in the art.

The storage 210 is a non-transitory memory that stores data for providing the functionality described herein. The storage 210 is coupled to the bus 206. The storage 210 may be a dynamic random access memory (DRAM) device, a static random access memory (SRAM) device, flash memory or some other memory devices. In some instances, the storage 210 also includes a non-volatile memory or similar permanent storage and media including a hard disk drive, a floppy disk drive, a CD-ROM device, a DVD-ROM device, a DVD-RAM device, a DVD-RW device, a flash memory device, or some other mass storage for storing information on a more permanent basis.

In some instances, the storage 210 stores social network profiles associated with users in a social network, conversation messages in a conversation, actionable entities identified from the conversation, contextual indicators determined from the conversation and/or other conversations, suggestions generated based on the actionable entities of the conversation, etc.

In some instances, the suggestion application 132b comprises a controller 220, a conversation management module 222, a model builder 224, a conversation analyzer 226, a determining engine 228, a suggestion generator 230, and a user interface engine 236.

The controller 220 can be code and routines for receiving data and transmitting the data to an appropriate component. In some instances, the controller 220 can be a set of instructions executable by the processor 202 to provide the functionality described below for receiving and transmitting the data. In other instances, the controller 220 can be stored in the memory 204 of the computing device 200 and can be accessible and executable by the processor 202. In some instances, the controller 220 can be adapted for cooperation and communication with the processor 202 and other components of the computing device 200.

In some instances, the controller 220 receives data via the communication unit 208 and transmits the data to the appropriate module of the suggestion application 132. For example, the controller 220 receives user information from the client device 102 via the communication unit 208 and transmits the user information to the model builder 224 to build and update a machine learning model. In another example, the controller 220 receives contextual indicators of an entity in a conversation from the conversation analyzer 226 and a determination that the entity is actionable from the determining engine 228, and transmits the contextual indicators of the actionable entity to the suggestion generator 230 to generate a suggestion for a user to take an action on the entity.

The conversation management module 222 can be code and routines for generating and managing a conversation session. In some instances, the conversation management module 222 can be a set of instructions executable by the processor 202 to provide the functionality described below for generating and managing a conversation session. In other instances, the conversation management module 222 can be stored in the memory 204 of the computing device 200 and can be accessible and executable by the processor 202. In some instances, the conversation management module 222 can be adapted for cooperation and communication with the processor 202 and other components of the computing device 200.

In some instances, the conversation management module 222 generates a conversation session and instructs the user interface engine 236 to generate graphical data for displaying the conversation session in a conversation interface. A conversation session or a conversation is a multi-user communication session that comprises at least one of a video conference, an audio conference, and instant messaging. A conversation includes at least one conversation message. A conversation message may include a video message, an audio message, a text message, a photo, a hyperlink, etc. In some instances, the conversation management module 222 generates a conversation by interacting with audio and video capture devices of the client device 102 to obtain a real-time audio-video synchronous communication data stream of the user 104. For example, the conversation management module 222 interfaces with a software driver stored on the client device 102 that controls the functionality of a microphone and a video camera (e.g., a webcam or forward facing camera) included in the client device 102, and generates a conversation based on the audio-video data captured by the client device 102. The audio-video data can be encoded using various audio and video codecs. In other instances, the conversation management module 222 generates a conversation that allows users participating in the conversation to share documents, a scratchpad, and/or computing device screens with one another.

In some instances, the conversation management module 222 receives a suggestion automatically generated by the suggestion generator 230 based on a conversation message of a conversation, and communicates with the user interface engine 236 to generate graphical data for displaying the suggestion along with the conversation message in the conversation. In other instances, the conversation management module 222 provides one or more applications or services in a conversation and instructs the user interface engine 236 to generate one or more tools in a conversation interface for a user to interact with the one or more applications or services. For example, the conversation management module 222 instructs the user interface engine 236 to generate a search box in a conversation interface for a user to search conversations based on topics, time, etc.

In some instances, the conversation management module 222 also communicates with other servers (e.g., a third-party server 110) via the communication unit 208 to receive conversation messages from other conversations. The other conversations may be generated by other applications on the other servers. The conversation management module 222 forwards the conversation messages to other components (e.g., 224-236) of the suggestion application 132b to generate a suggestion. In some instances, the conversation management module 222 also stores the conversation messages in storage 210.

The model builder 224 can be code and routines for generating and/or updating a machine learning model. In some instances, the model builder 224 can be a set of instructions executable by the processor 202 to provide the functionality described below for generating and/or updating a machine learning model. In other instances, the model builder 224 can be stored in the memory 204 of the computing device 200 and can be accessible and executable by the processor 202. In some instances, the model builder 224 can be adapted for cooperation and communication with the processor 202 and other components of the computing device 200.

The model builder 224 receives information from the conversation generated and received by the conversation management module 222, extracts features from the information and generates a model based on the extracted features. The model includes items relevant to users such as a location, a list of interests, etc. An interest can be explicit from a user's indication of what he or she likes. An interest can also be information inferred from a user's activities. For example, if a user talks about hiking equipment in several conversations, the model builder 224 infers that the user is interested in outdoor activities. In some instances, the model builder 224 also receives user information from a variety of sources including, for example, queries, document retrieval, user interactions, emails, etc., and builds a model based on the information. For example, the model builder 224 includes a user's search history into the model. In another example, upon receiving a collection of documents returned for a query and ranks associated with each document, the model builder 224 builds the model to include the ranks to show the relevancy between a document and the query.

In some instances, the model builder 224 generates the model to include user statistics and user behavior pattern data, for example, how often a user joins a conversation, with whom a user talks most in conversations, what time a user likes to have a conversation with others, whether a user likes to share photos in a conversation, what kind of photos the user likes to share, etc. In other instances, the model builder 224 generates the model to include a sequence of weights and multipliers that are used to make predictions about a user action. In some instances, the model builder 224 determines weights and multipliers based on social relationships between users. For example, the model builder 224 receives conversation messages from the conversation management module 222. The conversation messages include a question raised in a conversation and replies of a first user and a second user to the question. The model builder 224 communicates with the social network application 124 to determine that the first user is a close friend of a third user and the second user does not know the third user personally based on the social graph managed by the social network application 124. The model builder 224 assigns a higher weight to the first user than to the second user. Later when the model is used to predict the user's behavior based on the actions of similar users, the reply of the first user will weigh more in predicting a potential answer of the third user to the question. In other instances, the model builder 224 determines weights and multipliers based on recency of conversation messages. For example, if a user talked about game A in a conversation last month and talked about game B in a conversation this month, the model builder 224 determines a higher weight for game B than game A when predicting which game forum the user would subscribe to. In some other instances, the model builder 224 determines weights and multipliers based on other factors including how often a user joins a conversation, what time a user likes to have a conversation with others, etc.

In some instances, the model builder 224 generates a model and maps a user to one or more categories based on the model. The category can be an entity identified by the conversation analyzer 226 as described below. For example, the model builder 224 determines that a user likes playing basketball, and categories the user into a category "sportsman" and a category "basketball." Or the model builder 224 categories a user that talks with other users every day into a category "talker."

In some implementations the model builder 224 generates a machine learning model. The model builder 224 collects data from a variety of sources including at least one conversation and uses a machine learning algorithm to learn certain properties from the collected data. The machine learning algorithms may include, but are not limited to, regression techniques, instance-based algorithms, decision trees, Bayesian algorithms, kernel methods, clustering methods, association rule learning, artificial neural networks, etc. The model builder 224 trains the model over time to understand the semantics of a conversation and derives meaning from the real time conversation. As the model evolves, the efficiency and accuracy of using the model in suggestion making, behavior prediction, etc., are improved.

The model builder 224 uses user actions as training signals to train the model. In some instances, the model builder 224 tracks actions of a user in previous conversations and trains the model to learn from those user actions. For example, the model builder 224 learns that a user never buys anything that was offered in a conversation interface with a purchase tool or learns that two users always choose a particular coffee house as their meeting spot from the previous conversations between them. In other instances, the model builder 224 tracks the non-chat actions of a user and trains the model to learn from the non-chat actions. For example, the model builder 224 learns a user's favorite chocolate brand from the user's purchase history. Based on what was learned by the model, a suggestion can be made for a user. For example, when a user talks about flying to Florida for a vacation in a conversation, a suggestion of flight itineraries (e.g., a time and airline) can be made to the user since the model builder 224 learns that the user likes this airline and often takes the flights around that time from previous actions of users. In some instances, the model builder 224 receives a user reaction to a suggestion provided to the user in a conversation and in turn uses the reaction (and other data from the conversation) as a training signal to train the model (e.g., uses the reaction to generate a training example that is used to refine the model through further training). Continuing with the above example, if the user drops the flight itinerary suggestion or explicitly states a dislike of the airline (e.g., by writing "I do not like this airline") in a conversation, the model builder 224 may take this negative reaction as a signal to train the model. As a result, a different airline may be suggested to the user in the future.

In some instances, the model builder 224 updates the model when receiving a request. For example, the suggestion generator 230 requests the model builder 224 to update the model when generating a suggestion using the model. In other instances, the model builder 224 periodically (once an hour, once a day, once a week, etc.) and/or non-periodically receives data and/or non-periodic data from a variety of sources for updating the model and updates the model accordingly. In some other instances, the model builder 224 updates the model once a user action in a conversation, a non-chat action, or a user reaction is received.

The conversation analyzer 226 can be code and routines for analyzing a conversation to identify an entity that a user may take an action on from a conversation message and determine contextual indicators of the entity in the conversation. In some instances, the conversation analyzer 226 can be a set of instructions executable by the processor 202 to provide the functionality described below for analyzing a conversation to identify an entity that a user may take an action on from a conversation message and determine contextual indicators of the entity in the conversation. In other instances, the conversation analyzer 226 can be stored in the memory 204 of the computing device 200 and can be accessible and executable by the processor 202. In some instances, the conversation analyzer 226 can be adapted for cooperation and communication with the processor 202 and other components of the computing device 200.

The conversation analyzer 226 processes one or more conversation messages of a conversation received from the conversation management module 222 based on a machine learning model generated by the model builder 224. In some instances, the conversation analyzer 226 analyzes each conversation message using natural language processing (NLP) techniques. In some instances, the conversation analyzer 226 parses the conversation message and implements NLP entity extraction on the parsed conversation message to obtain an entity. The entity can be a portion of a conversation message, for example, a person or an object in the conversation and the entity can be at various levels of granularity (e.g., a restaurant, an Italian restaurant, a particular Italian restaurant). In some instances, the NLP entity extraction is based on a semantic annotation for text (SAFT) library that works in the machine learning model. For example, the model builder 224 receives a flight number, builds an annotator into the model to recognize the flight number in a conversation based on the general format of flight numbers, and trains the annotator. When this flight number is mentioned in a conversation message, the conversation analyzer 226 communicates with the model builder 224 to use the annotator to determine that one entity in the conversation message is the flight number. In another example, the conversation analyzer 226 parses and extracts entities "beautiful," "weather" and "Store A" from a conversation message. The conversation analyzer 226 then determines that "beautiful" is an adjective, "weather" is a noun, and "Store A" is a location and a noun based on the language semantic analysis using the SAFT library. An entity identified by the conversation analyzer 226 can be actionable or non-actionable depending on whether a user can take an action on it. The determination whether an entity is actionable or non-actionable is described in more detail with reference to the determining engine 228.

In combination with (e.g., before, after, and/or during) identifying an entity, the conversation analyzer 226 determines contextual indicators of the entity in the conversation. For example, for a location entity, the conversation analyzer 226 determines when the location was mentioned in the conversation, who mentioned the location in the conversation, which content of the conversation included the location, which kind of content followed the location in the conversation, and/or other contextual indicators. In some instances, the conversation analyzer 226 analyzes multiple conversations (e.g., previous conversations, conversations generated by other applications) to determine contextual indicators of an entity in a conversation.

In certain implementations, the conversation analyzer 226 performs NLP to determine the contextual indicators of an entity in a conversation. In some of those implementations, the NLP is based on the machine learning model generated by the model builder 224 and may be more sophisticated than conventional NLP in many aspects. In some instances, the conversation analyzer 226 performs the NLP based on pattern matching in combination with user information of one or more users in a conversation. For example, the conversation analyzer 226 can detect the phrase "Basil Thai restaurant" from a conversation message based on pattern matching, and match that phrase to one or more particular restaurants named "Basil Thai" based on user information of one or more user(s) (e.g. "Basil Thai" restaurant(s) that are most proximal to location(s) of the user(s)). As another example, the conversation analyzer 226 can detect a particular "Coffee house" near user A from a conversation message based on pattern matching in combination with user information. In some implementations, using user information to select one or more particular entities may lead to improved suggestions. For example, based on "Basil Thai restaurant" without user information, 3 restaurants named "Basil Thai" may be identified and, if a driving direction is suggested to participant(s) in a conversation, the suggestion may include three maps to all three "Basil Thai restaurants". The participant(s) then have to choose which map is relevant and accurate. On the other hand, where user information is utilized, only one relevant and accurate driving direction to a "Basil Thai restaurant" may be provided (e.g., the one that is most convenient to all participants of the conversation and/or the one most frequently visited by participant(s)).

In other instances, the conversation analyzer 226 additionally or alternatively determines contextual indicators by performing sentiment analysis on a conversation message and associating the conversation message with a weight. For example, the conversation analyzer 226 receives messages "I hate coffee," "tea is ok" and "coke is my favorite" from user A, and associates a most favorable to least favorable sentiment weight to the messages including coke, tea, and coffee, respectively. The weights indicate user A's beverage taste. In other words, the weights may each indicate a sentiment of user A with respect to each "beverage" entity corresponding to the entities of "coffee", "tea", and "coke". The messages may be from a current conversation in which a suggestion is to be provided and/or from a prior conversation that includes the user (with or without other participants of the current conversation). In some instances, the conversation analyzer 226 assigns a positive number to indicate a positive sentiment, a negative number to indicate a negative sentiment, and a zero to indicate indifference. The conversation analyzer 226 may use the magnitude of the number as the weight or intensity of a sentiment and may assign the sentiment to a corresponding entity. For the above example, the conversation analyzer 226 weights a positive two, a positive one, and a negative two, to the messages including coke, tea and coffee, respectively. In some instances, the conversation analyzer 226 determines a sentiment from an emotion symbol and/or other non-textual element included in a conversation message and assigns a weight to the sentiment. For example, the conversation analyzer 226 may determine that a user is happy and excited from the message "mom is coming☺," (e.g., based on presence of the emotion symbol "☺" and assignment of that symbol to a happy sentiment) and may determine that the user is unhappy from the message "I wish mom is still here ☹" (e.g., based on presence of the emotion symbol "☹" and assignment of that symbol to a sad sentiment) The conversation analyzer 226 may associate each message with a positive number (or other measure) or a negative number (or other measure) to indicate how happy the user is. In some instances, the conversation analyzer 226 may determine an overall sentiment based on the weights and the number of the conversation messages. Such information become contextual indicators and contribute to generating a suggestion. For example, if a user says that "I wish mom is still here ☹," "Amy is not here too" and "I should go see a movie," the conversation analyzer 226 determines that overall the user is not happy. As a result, a comedy movie instead of a tragedy movie may be suggested to cheer the user up. The sentiment analysis on a conversation therefore makes a suggestion more intelligent.

In certain examples, the conversation analyzer 226 determines contextual indicators by taking more than one piece of conversation message for analysis. Standard and conventional conversational semantics may be generated, for example, "Barack Obama" in response to a query of "Who is the president of the USA?" in a conversation and to generate "Michelle Obama" in response to a query of "Who is the wife of Barack Obama?" in the conversation. Later when "him" and "her" are mentioned in the conversation, the conversation analyzer 226 references him with "Barack Obama" and references her with "Michelle Obama" using coreference resolution. The conversational NLP may be similar to conventional conversational semantics in some implementations. Both conventional conversational semantics and the conversational NLP may be based on semantic analysis on individual messages. The conversation analyzer 226 may further analyze contiguous and/or non-contiguous messages in a conversation rather than analyzing only a single message. In some instances, the conversation analyzer 226 analyzes multiple conversation messages to track conversation flows from each participant of a conversation. The conversation analyzer 226 tracks users for possible participants of a conversation and determines the conversation flow, i.e., which participant sends which message in what order. The conversation analyzer 226 refines the contextual indicators based on the tracking information. For example, the conversation analyzer 226 may analyze two contiguous messages "would you like to meet?" and "how about ABC?" of a conversation. The conversation analyzer 226 tracks participants of the conversations, and determines that a first participant sent the first message and a second participant sent the second message. Further, the conversation analyzer 226 determines that the location entity "ABC" is proposed by the second participant to respond to a question from the first participant. In other instances, the conversation analyzer 226 refines the contextual indicators based on information tracked from multiple conversations. The conversation analyzer 226 may refine the contextual indicators based on common terms that have occurred in multiple conversations. For example, the conversation analyzer 226 identifies an entity "hiking" from a message "do you want to go hiking?" sent from user A when talking with user B today. The conversation analyzer 226 tracks conversation flows and determines that a message "I prefer fishing to hiking" from user B in a previous conversation should be used as contextual indicators for the entity "hiking." The conversation analyzer 226 may refine the contextual indicators based on concept clustering of terms occurred in multiple conversations. For example, the conversation analyzer 226 determines messages including "mountain bike," "backpack," "camping" from multiple conversations can be used as contextual indicators for the message "do you want to go hiking" received in an ongoing conversation since the terms "mountain bike," "backpack," "camping" and "hiking" can be classified into a cluster "outdoor activity" based on concept clustering.

In some instances, the conversation analyzer 226 also analyzes a conversation to determine the tense (e.g., whether a conversation message is in the past tense), the recency (e.g., whether a conversation message is new, how to weigh a new or old conversation message), etc. The conversation analyzer 226 further collects data including user profile information (e.g., an age, a gender), conversation metadata (e.g., a start time and an end time of a conversation, participants of the conversation, timestamps associated with each conversation message), and uses the collected data as contextual indicators. Authorization is obtained prior to the use of any profile information or personal information of the user.

The determining engine 228 can be code and routines for determining whether an entity is actionable. In some instances, the determining engine 228 can be a set of instructions executable by the processor 202 to provide the functionality described herein for determining whether an entity is actionable. In other instances, the determining engine 228 can be stored in the memory 204 of the computing device 200 and can be accessible and executable by the processor 202. In some instances, the determining engine 228 can be adapted for cooperation and communication with the processor 202 and other components of the computing device 200.

Whereas the conversation analyzer 226 identifies an entity from a conversation message of a conversation and determines contextual indicators of the entity in the conversation, the determining engine 228 determines whether the determined entity is actionable. An entity is actionable if a user is likely to take an action on it. The determining engine 228 determines an entity is an actionable entity when the entity is in a context of conversation where a user is likely to take an action on the entity. As described herein, whether a user is likely to take action on an entity is determined by the determining engine 228 utilizing one or more of various techniques and is based on one or more contextual parameters described herein. In some instances, the determining engine 228 detects one or more action verbs, the subject and/or the object of the one or more verbs and associated context, and determines an actionable entity based on the detected information. An action verb is a verb that expresses physical or mental action such as walk, read, want, think, etc. For example, if the conversation analyzer 226 identifies the location entity "supermarket C" from a message "meet at supermarket C" between user A and user B in the conversation, the determining engine 228 may detect an action verb "meet," an object "supermarket C" of the verb "meet," and determine that this location entity "supermarket C" is actionable because users A and B may meet at the place. However, if the conversation analyzer 226 identifies the location entity "supermarket C" because user A comments that "supermarket C is super good" in the conversation, the determining engine 228 fails to detect an action verb and associated object/subject. As a result, the determining engine 228 may not determine that the location entity "supermarket C" is actionable because no action is detected. Each time when an entity appears in a conversation, the determining engine 228 classifies the entity as actionable or non-actionable. When the entity is classified as actionable, the determining engine 228 highlights or otherwise annotates the actionable entity for use by one or more other components as described herein.

In some instances, the conversation analyzer 226 analyzes all conversation messages in the conversation to determine contextual indicators of an entity identified from a conversation message of the conversation. The determining engine 228 determines whether the entity is actionable based on the contextual indicators. In some instances, the determining engine 228 determines whether an entity is actionable based on a conversation flow. For example, user A enters a question "meet at ABC?" In certain examples, the determining engine 228 may not determine whether the location "ABC" is actionable until receiving user B's answer in the conversation flow. If user B says "Sure," the determining engine 228 then determines that "ABC" is actionable. Otherwise, the determining engine may determine "ABC" as non-actionable. In another example, if the conversation flow includes a first message "where would you like to meet?" from user A, a second message "how about ABC?" from user B, a third message "I like DEF better" from user A and a fourth message "DEF is good" from user B, the determining engine 228 may determine "DEF" rather than "ABC" as an actionable entity. In other instances, the determining engine 228 determines whether an entity is actionable based on the tense of the message. For example, the determining engine 228 may determine that the flight number 1234 in the message "I used to take 1234 to New York" is non-actionable since the message is in the past tense. In some other instances, the determining engine 228 determines whether an entity is actionable based on sentiment indicators. For example, the determining engine 228 determines "pasta" is non-actionable based on the message "want pasta for dinner?" from user A and the message "I hate pasta" from user B. However, the determining engine 228 may still determine that "dinner" is actionable. A suggestion that gives more details or completes an action (e.g., a pizza restaurant) may still be provided to user A. The determining engine 228 also determines whether an entity is actionable based on other contextual indicators determined by the conversation analyzer 226.

The determining engine 228 determines whether an entity is actionable based on contextual indicators, which differs the present disclosure from some approaches and may therefore be advantageous. For example, the conventional approaches may determine that today is Alice's birthday based on a previous conversation between Alice and her friend, and automatically send her a "Happy Birthday" message and a fun video clip to celebrate her birthday. Implementations of the present disclosure sends such automatic celebration messages to Alice only if the contextual condition is determined to be appropriate. If Alice said that "my house was burn down" a few hours ago, the determining engine 228 decides not to send any celebration message to Alice since the message can only be an annoying spam for Alice. As another example, if User A provided a message of "I love Coffee Shop A" in a prior conversation, then in a current conversation provides a message to User B of "Want to grab some coffee", a suggestion directed to "Coffee Shop A" may be provided to User B for incorporation in the current conversation. The suggestion may be provided based on User A's previous expression of positive sentiment directed toward "Coffee Shop A" and may optionally be provided even if User B was not involved in the prior conversation.

In some implementations, in addition to automatically determining an actionable entity based on contextual indicators in a conversation, the determining engine 228 also allows a user to manually determine which entity is actionable. Even if the determining engine 228 did not detect that an entity is actionable, the determining engine 228 allows a user to make the entity actionable. As a result, any message in a conversation can be actionable. In some instances, the determining engine 228 receives an indication from a user to mark an entity in a conversation message as actionable and returns information relevant to the entity to the user. For example, a user mentions "panda" in a conversation message. The user (or another user) determines that this word is the most important entity in the message and indicates that this word is actionable (e.g., by labelling the word via user interface input such as a "tap on" or other selection of the word). Responsive to receiving this indication, the determining engine 228 communicates with other servers or applications (e.g., a search server 112 and/or third-party server 110) to retrieve information related to "panda" (e.g., a first search result from search server 112) to the user. In some instances, responsive to receiving an indication that a user wants to take an action on an entity, the determining engine 228 also sends the indication as a training signal to the model builder 224 to train the machine learning model based on the indication. For example, the model builder 224 may, based on the indication, generate a positive training example with training example output indicating an actionable entity and training example input that is based on the message in which the indication was made, the word(s) that were the focus of the indication, and/or contextual indicators associated with the conversation. The model builder 224 may refine the machine learning model by further training the model based on the positive training example.

The suggestion generator 230 can be code and routines for generating a suggestion for a user to take an action on an entity. In some instances, the suggestion generator 230 can be a set of instructions executable by the processor 202 to provide the functionality described herein for generating a suggestion for a user to take an action on an entity. In other instances, the suggestion generator 230 can be stored in the memory 204 of the computing device 200 and can be accessible and executable by the processor 202. In some instances, the suggestion generator 230 can be adapted for cooperation and communication with the processor 202 and other components of the computing device 200.

Responsive to receiving an actionable entity from the determining engine 228, the suggestion generator 230 generates a suggestion for the actionable entity to offer richer context and next steps. The suggestion is information that is useful to make an entity more actionable for a user or to complete an action for a user. For example, when users suggest meeting at a restaurant, the suggestion generator 230 can provide more details about the restaurant and offer to book a table. When users talk about watching a movie, the suggestion generator 230 can offer show times or a link to the movie stream. When users mention a video clip from a website, the suggestion generator 230 can bring it up for users to play in the conversation. In some instances, the suggestion generator 230 generates a real-time suggestion. For example, when users are talking about lunch at a restaurant, the suggestion generator 230 generates a map in real time to direct the users to the restaurant.

In some instances, the suggestion generator 230 instructs the user interface engine 236 to incorporate at least one suggestion tool into a conversation interface. The suggestion generator 230 uses the suggestion tool to display a suggestion and receive user interactions with the suggestion. For example, the suggestion generator 230 instructs the user interface engine 236 to generate at least one suggestion tool to display a map for a user viewing and selecting, to display a calendar for a user viewing and scheduling, to find and share contact information, to share a file, to set up a reminder, to display a video or initiate a video call, to share stickers, to display weather information, to display sports scores, to display product or service (e.g., clothes, movies, medical service) purchase information, to display flight information, to provide traffic data, to provide local event information, to provide local merchant information (e.g., restaurants, movie theaters), to share user status (e.g., driving, biking, running), to find and share a product (e.g., a mobile application, a game), to pay or receive a payment for a product or service, etc. One skilled in the art will recognize that other types of suggestions are possible.

In some implementations, the suggestion provided by the suggestion generator 230 is a selectable suggestion. In some of those implementations, in response to selection of the suggestion by a participant of the conversation, the suggestion generator may incorporate the suggestion (and/or related content) into a transcript of the conversation. For example, the suggestion generator 230, in response to selection of the suggestion, may cause it (and/or related content) to be statically displayed in the transcript for all participants of the conversation. For instance, the suggestion may initially be provided to the user interface engine 236 for presentation to one or more of the recipients in their corresponding conversation interfaces as a non-static graphical element (e.g., presented in the interface, but not fully incorporated in the transcript). Then, in response to selection of the suggestion by one or more of the participants, the suggestion (and/or related content) may be statically incorporated into the transcript of the conversation. In some implementations where the suggestion is selectable, it may include an affirmative interface element and a negative interface element. In response to selection(s) of the affirmative interface element, the suggestion may be incorporated in the transcript and in response to selection(s) of the affirmative interface element the suggestion may be discarded without static incorporation of the suggestion into the transcript.

In some instances, the suggestion generator 230 generates a suggestion based on what the machine learning model from the model builder 224 learns from user actions. In some instances, the model builder 224 trains the machine learning model to learn from user's non-chat actions and the suggestion generator 230 generates a suggestion based on the machine learning model. For example, if a user talks about taking a flight to Las Vegas next weekend, the determining engine 228 determines an actionable entity "flight" and the suggestion generator 230 offers a suggestion of a flight itinerary (e.g., time and airline) based on user's previous purchase history learned in the machine learning model. In other instances, the model builder 224 trains the machine learning model to learn from reactions of a user to previous suggestions and the suggestion generator 230 generates a suggestion based on the machine learning model. The suggestion generator 230 may communicate with the user interface engine 236 to customize a new suggestion tool in a conversation interface based on user actions taken to previous suggestion tools offered in the conversation interface. For example, the model builder 224 trains the machine learning model to learn that a user never made any purchase using purchase tools previously offered in a conversation interface displayed to the user. As a result, the suggestion generator 230 determines no longer to incorporate a purchase tool in the conversation interface. Similarly, the suggestion generator 230 used to provide a traffic map tool and a public transport tool to a user. The suggestion generator 230 learns from the machine learning model that the user always interacted with the public transport tool, and therefore determines to generate and provide only a public transport tool to the user in the future. In another example, user A and user B always discuss or select Coffee house as a meetup spot. When user A asks user B "meet today?," the suggestion generator 230 generates a map suggestion and instructs the user interface engine 236 to include a map tool and highlight the Coffee house nearby in the map tool.

In other instances, the suggestion generator 230 generates a suggestion based on the conversation analysis (e.g., NLP) and contextual indicators determined from the conversation analyzer 226. The suggestion generator 230 generates a suggestion based on the sentiment analysis. For example, user A asks "Coffee house, 8 am tomorrow?" and user B answers "really? early bird on Sunday?" When the suggestion generator 230 generates a map and a calendar for the actionable entity "Coffee house," the suggestion generator 230 may highlight the available time around noon on the calendar based on the sentiment analysis. The suggestion generator 230 generates a suggestion based on user information conveyed in a conversation. For example, if user A says "let's meet tomorrow" and user B says "great! I'll be in San Francisco," the suggestion generator 230 may provide a map of San Francisco to users A and B even if neither user is at San Francisco when the conversation occurs. The suggestion generator 230 generates a suggestion based on user profile information. Authorization is obtained prior to the use of any profile information or personal information of the user.

Figure 10:
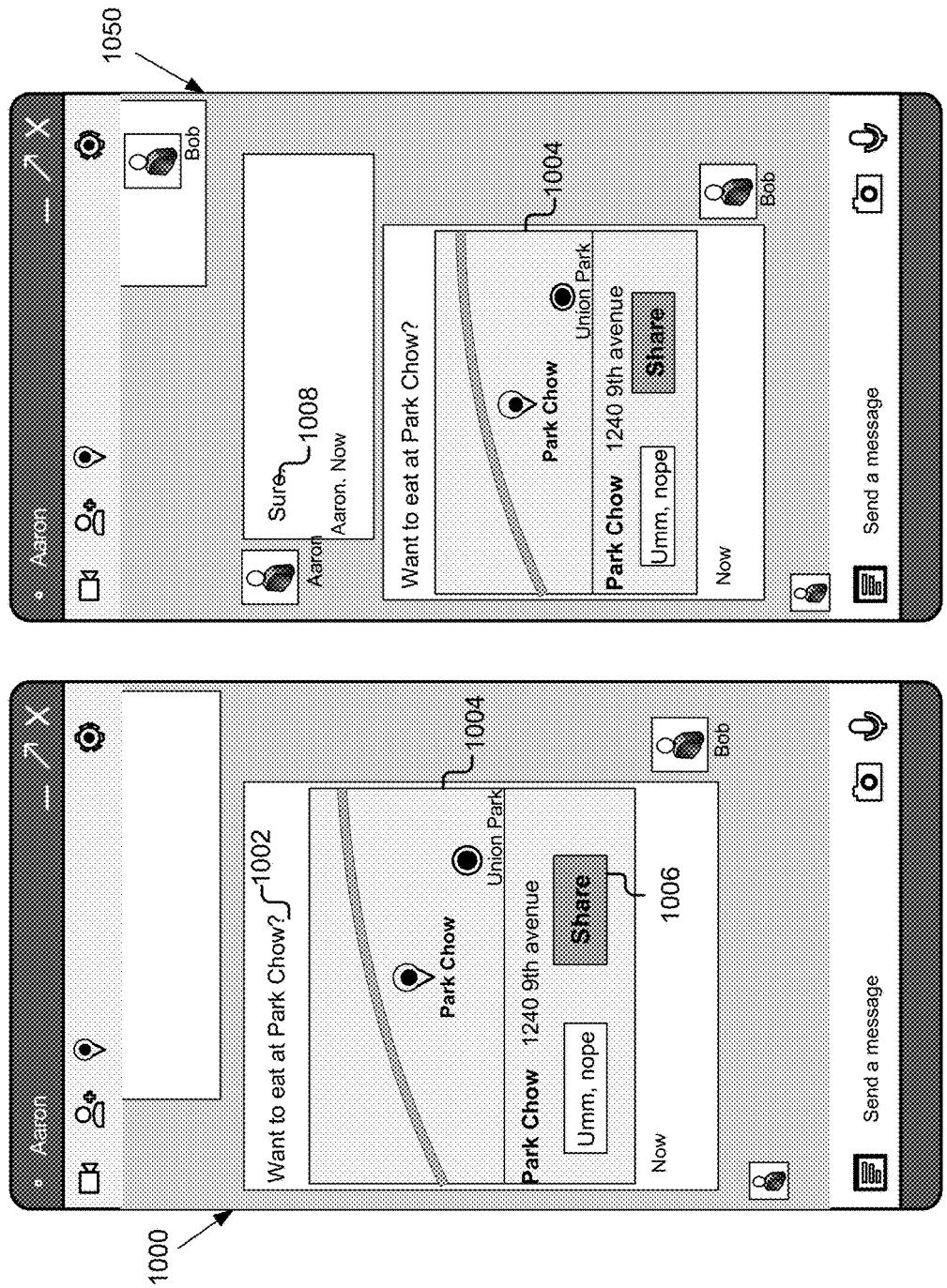
FIG. 10 includes graphic representations of example conversation interfaces showing a suggestion.
Figure 11A:
FIG. 11A is a graphic representation of an example conversation interface showing a conversation generated by a first application.
Figure 11B:
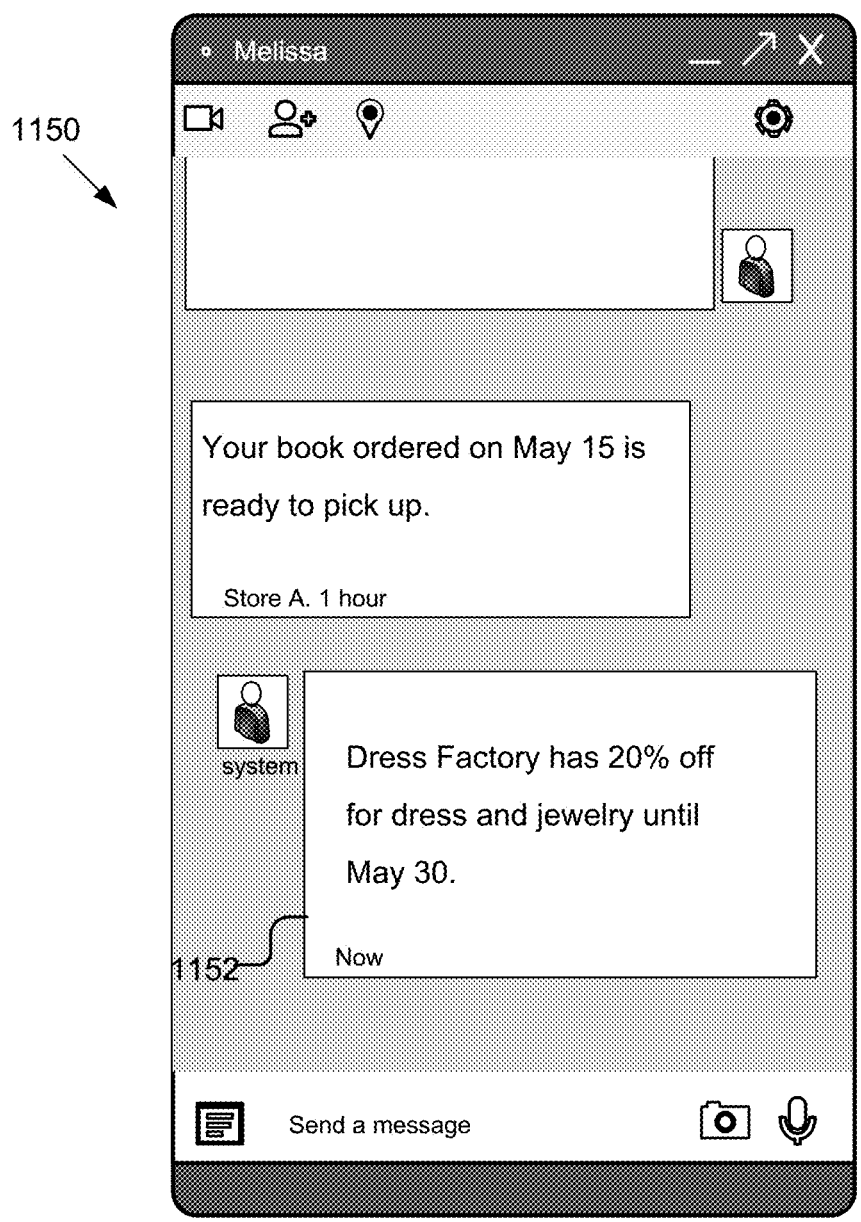
FIG. 11B is a graphic representation of an example conversation interface showing a suggestion generated by a second application.

In some instances, the suggestion generator 230 generates a suggestion by pulling data from a search engine and/or other applications into a conversation. For example, the suggestion generator 230 receives map data around a location from a map service in the conversation and generates a map suggestion for the actionable location entity. An example conversation interface including a suggestion is depicted in FIG. 10. In other instances, instead of itself generating a suggestion for a user to take an action on an entity, the suggestion generator 230 feeds the entity information into other applications and services. The other applications and services may themselves optionally directly provide a suggestion for a user to take an action on the entity. For example, if a flight number is mentioned in a conversation, the suggestion generator 230 notifies a third-party server to provide flight feeds (e.g., delay information) to one or more participants in the conversation (e.g., by incorporating those flight feeds into the transcript of the conversation and/or via notifications provided via another application). If the user mentions a friend that the user likes in the conversation, the suggestion generator 230 communicates with an advertisement application to use this information to target the user with advertising. If the user mentions a sports game in the conversation, the suggestion generator 230 communicates with a third-party service to provide the sports scores of the sports game to the user. An example conversation interface including a suggestion provided by a different application is depicted in FIGS. 11A and 11B.

In some instances, the entity information includes participants of the conversation from which the entity is identified. When the suggestion generator 230 feeds the entity information into other services, the other services may provide a suggestion to all (or a subset of) the participants of the conversation. For example, if user A mentions weather in a conversation with user B and user C, a weather service may send a hourly weather report to users A, B and C after receiving entity information of "weather" from the suggestion generator 230. In other instances, at the time the suggestion generator 230 feeds entity information into other services, the suggestion generator 230 also communicates with the conversation management module 222 and the user interface engine 236 to initiate a live conversation in a conversation interface. The other service provides a suggestion for the user to take an action on the entity in the live conversation. In the above example, the other services may provide the hourly weather report either in an interface provided by the other services or in the live conversation provided by the conversation management module 222 and the user interface engine 236.

By understanding the context of a conversation and connecting users with other services, the suggestion generator 230 can provide smarter, more relevant, more searchable suggestions to a user, and therefore is more useful and effective. The suggestion generator 230 takes a step further and ventures into a personal assist space. Instead of receiving user questions "can you recommend me of a show this weekend in San Francisco? can you book a flight to Seattle on Tuesday morning?" and answering the questions based on multiple applications, searches, comparisons and form fillings, the suggestion generator 230 asks questions for users and answers the questions on their behalf. As chat is becoming the go to application on user's smart phone, the suggestion generator 230 incorporating with other modules and engines now fits well into this area by drawing information from the chat and providing relevant updates. In particular, the suggestion generator 230 communicates with other services to provide important updates in one place for all participants. Connecting users with other services by the suggestion generator 230 could also drive more users into other services since it wouldn't require users to download a separate mobile application for another service. Furthermore, the suggestion generator 230 offers developer components to build different type of services including understanding and translating user's conversations into actions, for example, voice commands and wear equipment.

In some instances, the suggestion generator 230 comprises a response predictor 232 and a report module 234.

The response predictor 232 can be code and routines for detecting a question for a user in a conversation and determining a potential user reply to the question. In some instances, the response predictor 232 can be a set of instructions executable by the processor 202 to provide the functionality described below for detecting a question for a user in a conversation and determining a potential user reply to the question. In other instances, the response predictor 232 can be stored in the memory 204 of the computing device 200 and can be accessible and executable by the processor 202. In some instances, the response predictor 232 can be adapted for cooperation and communication with the processor 202 and other components of the computing device 200.

Users reply to a question either by typing, which can be especially hard on a touch screen of a client device, or by copying and pasting from other places where the users find answers. The response predictor 232 predicts users' potential answer and supplies users with a next reply, which is better than typing or copy-paste. For example, when a user is asked in a conversation when his or her flight is going to land, the response predictor 232 can make flight information available as a reply for the actionable entity "flight."

In some instances, the response predictor 232 predicts how a user would want to reply to a question based on the contextual indicators and the conversational analysis from the conversation analyzer 226 and the machine learning model from the model builder 224. For example, the response predictor 232 determines how a user tends to reply a certain type of questions based on what the machine learning model has learned from the conversation history and then offers one or more potential replies for the user. If the response predictor 232 learns that 30% of the time people respond A and 70% of the time people respond B to a question from the machine learning model, the response predictor 232 may supply answer B for a user that is going to answer the same question. The response predictor 232 is at a particular advantage because of the contextual indicators and the conversational analysis received from the conversation analyzer 226. Knowing users' location, context, and other personal information enables the response predictor 232 to more easily and/or accurately predict a reply. For example, given the messages "I hate coffee" and "the tea house on the X street is the best" from user A in previous conversations, the response predictor 232 can easily supply the address of "the tea house on the X street" as the potential answer for user A when user B asks user A "which is your favorite place for coffee or tea?."

In other instances, the response predictor 232 also determines the type of answers based on the type of questions. The response predictor 232 determines the type of questions based on the understanding of the sentence structure from the conversation analyzer 226. For example, the response predictor 232 provides A and B as potential answers if the question is "A or B?." Or the response predictor 232 provides "yes" and "no" as potential answers when the question is "do you like A?." The response predictor 232 also determines the type of questions based on other contextual indicators determined by the conversation analyzer 226. For example, user A is asked "will you be in Los Angeles tomorrow?." If the previous conversations show that user A has a ticket to Los Angeles, the response predictor 232 would determine this is a yes or no question and provide "yes" or "no" as potential answers for user A. However, if the previous conversations show that user A has booked a ticket but has not received a confirmation number after a few days, the response predictor 232 may not think this is a yes or no question and instead provide "I don't know" as a potential answer.

In some instances, the response predictor 232 provides a potential user reply in one-tap form and/or other single selection form. For example, assume the question is "can I send your contact info?." The question includes an actionable entity "contact info." Further assume a previous conversation includes "your" contact info. The response predictor 232 may provide a one-tap contact info as an answer. A one-tap suggestion offered by the response predictor 232 based on the context of a conversation is convenient for a user in many ways (e.g., time, safety). For example, when user A sends user B a chat conversation, the response predictor 232 can send a one-tap suggestion saying that "I am driving" or even send "I will be home in 20 minutes" for user B to respond user A. When user B is flying and does not turn on the cell phone, the response predictor 232 can still automatically respond "I will be available four hours later" for user B based on a calendar. An example interface showing one-tap replies is depicted in FIG. 10.

The report module 234 can be code and routines for generating one or more reports related to a conversation based on organizing the conversation. In some instances, the report module 234 can be a set of instructions executable by the processor 202 to provide the functionality described below for generating one or more reports related to a conversation based on organizing the conversation. In other instances, the report module 234 can be stored in the memory 204 of the computing device 200 and can be accessible and executable by the processor 202. In some instances, the report module 234 can be adapted for cooperation and communication with the processor 202 and other components of the computing device 200.

Users lose track of things they share in conversations. The conversations may not be easily searchable, for example, a user may need to scroll up and down from a lot of search results to find a piece of information the user really wants. The report module 234 aggregates information across conversations, organizes the conversations, and makes the conversations easily searchable by topics, objects, and/or other metadata.

The report module 234 receives conversations and contextual indicators determined from the conversations by the conversation analyzer 226, and organizes the conversations based on the contextual indicators. In some instances, the report module 234 organizes the conversations based on content. For example, the report module 234 organizes the conversations to find conversations that talk about a movie or mention a location. In other instances, the report module 234 organizes the conversations based on timeline. For example, the report module 234 organizes the conversations that mention a location in a descending time order. In other instances, the report module 234 organizes the conversations based on conversation flows. For example, the report module 234 retrieves conversation messages that include a location from the conversations, associates each message with a particular user who sent the message, and arranges the conversation messages in a descending time order. In another example, if a user says "click the search box," the report module 234 may determine that the next message in the conversation flow will be the word that the user specified in the search box and organizes the conversation in this order. In other instances, the report module 234 organizes the conversations based on sentiment and/or other feature(s). For example, the report module 234 organizes the conversations based on classifying people as electronic-book reader or paper-book reader. One skilled in the art, having had the benefit of the present disclosure, will understand that the report module 234 can organize the conversation based on other contextual indicators.

In some instances, the report module 234 also labels the important message (e.g., an actionable entity) for later follow up. The label can be flags, stars, etc. When a user mentions this message or searches for the message, the report module 234 can easily retrieve it. The report module 234 obtains additional information by labelling the messages, for example, how often this message was mentioned, when a user mentioned this message, etc.

Figure 13:
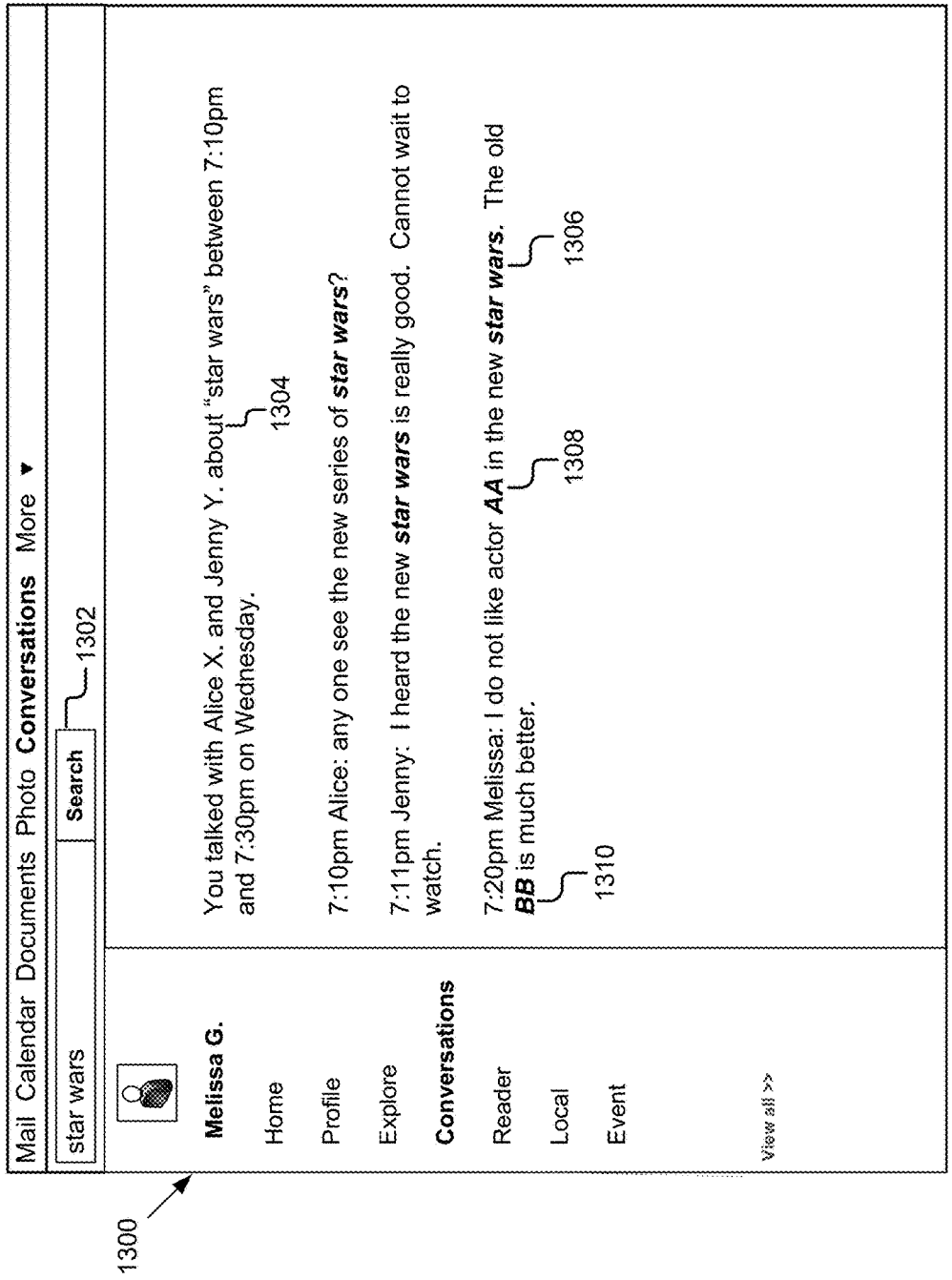
FIG. 13 is a graphic representation of an example conversation interface showing a conversation report.
Figure 14:
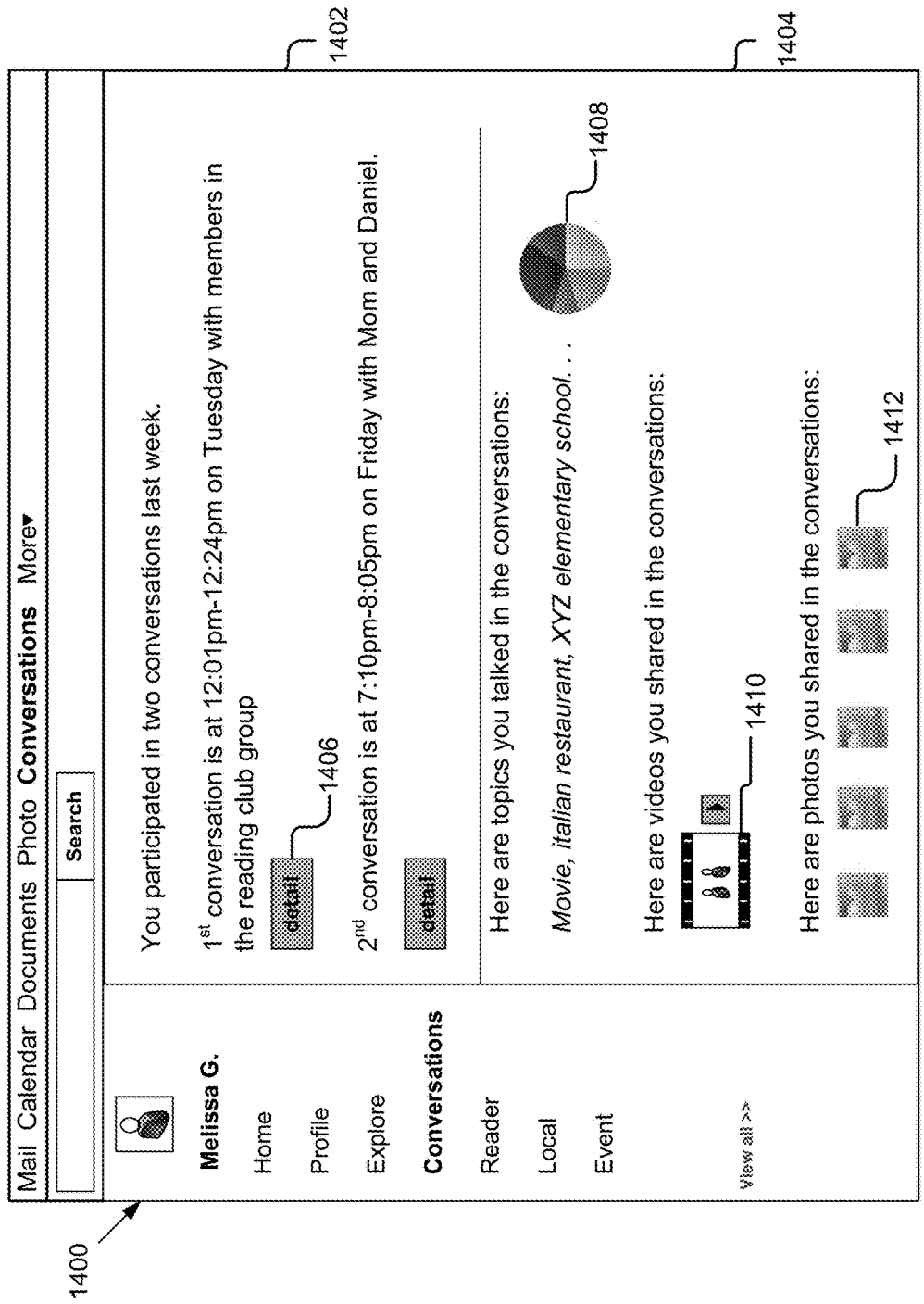
FIG. 14 is a graphic representation of an example conversation interface showing a conversation summary.

The report module 234 indexes the conversations (e.g., in a database stored in storage 210) based on organizing the conversations. When the report module 234 receives a search request for the conversations, the report module 234 searches the conversations using the indexes, generates a report and returns the report to a user. For example, responsive to receiving a search request for conversations talking about a movie, the report module 234 searches conversation content about the movie. The report module 234 organizes the search result based on ordering conversations according to the timeline of the conversations, associating each conversation message in a conversation with a user and a time, highlighting the important entities (e.g., movie names, theater names, show time, etc.,) and providing references back to the previous conversations based on the indexes. The report module 234 generates a report for a user based on organizing the conversation. An example conversation interface showing a conversation report is depicted in FIG. 13. In some instances, the report module 234 also generates a summary by organizing and summarizing conversations within a time period. For example, the report module 234 generates a summary for a user to show how many conversations the user participated in within a week, who the user talks with in the week, what topics the user talked about in the week, how many photos the user shared in the week, etc. An example conversation interface showing a conversation summary is depicted in FIG. 14.

What the report module 234 does is more than a trivial conversation search or a simple conversation summarization that a person can do. The report module 234 can retrieve the details for a user without necessitating that the user dig through and/or scroll through a verbatim transcript of a conversation. The report module 234 also gets updates on topics discussed in the conversation for a user (e.g., game scores or shows). In some implementations, the report module 234 provides not only a search result since users can look back at a meaningful trail of information shared based on events, places, people. The report module 234 also allows users to interact with a collection of things they've shared or discussed such as a list of all restaurants they've talked about in the past few months. In addition, the report module 234 provides a way to gain insights from conversations and to gauge context, sentiment, and/or other features. For example, the report module 234 can get valuable insights to gauge sentiment towards certain brands and to identify trending topics.

The user interface engine 236 can be code and routines for generating a conversation interface that displays conversation messages and suggestions of a conversation. In some instances, the user interface engine 236 can be a set of instructions executable by the processor 202 to provide the functionality described below for generating a user interface that displays conversation messages and suggestions of a conversation. In other instances, the user interface engine 236 can be stored in the memory 204 of the computing device 200 and can be accessible and executable by the processor 202. In some instances, the user interface engine 236 can be adapted for cooperation and communication with the processor 202 and other components of the computing device 200.

In some instances, the conversation management module 222 instructs the user interface engine 236 to generate graphical data for displaying a conversation and conversation messages in a conversation interface. In other instances, the suggestion generator 230 generates a suggestion for an actionable entity in a conversation. The conversation management module 222 instructs the user interface engine 236 to generate graphical data for displaying the suggestion along with a conversation message in a conversation interface. In some instances, the user interface engine 236 generates multiple suggestion tools in a conversation interface for displaying one or more suggestions and receiving user interactions with the suggestion(s).

A suggestion includes information for a user to take an action on an entity. In some instances, the user interface engine 236 generates multiple suggestion tools for presenting the suggestion in parallel with the message including the entity. For example, the user interface engine 236 shows the map tool of ski resorts and a snow report along with the message "go skiing" on the same screen. A user can view and select the map with the map tool. Or the user interface engine 236 may show two calendar tools for two users along with the message discussing meeting up next day. A user can view and schedule a calendar using the calendar tool. Or the user interface engine 236 may show different purchase tools for dress and shoes along with the message discussing celebrity's outfit. Or the user interface engine 236 may show a calendar tool highlighting times that two users are free next day and show a map tool highlighting coffee shops near addresses of both users along with the message "meet for coffee next day?" Or the user interface engine 236 may show a traffic map tool and a public transport tool along with the message "go from A to B?" In some instances, if a suggestion tool cannot fit into a screen (e.g., the small screen of a smart phone), the user interface engine 236 will show tool options first as multiple tools.

Figure 15:
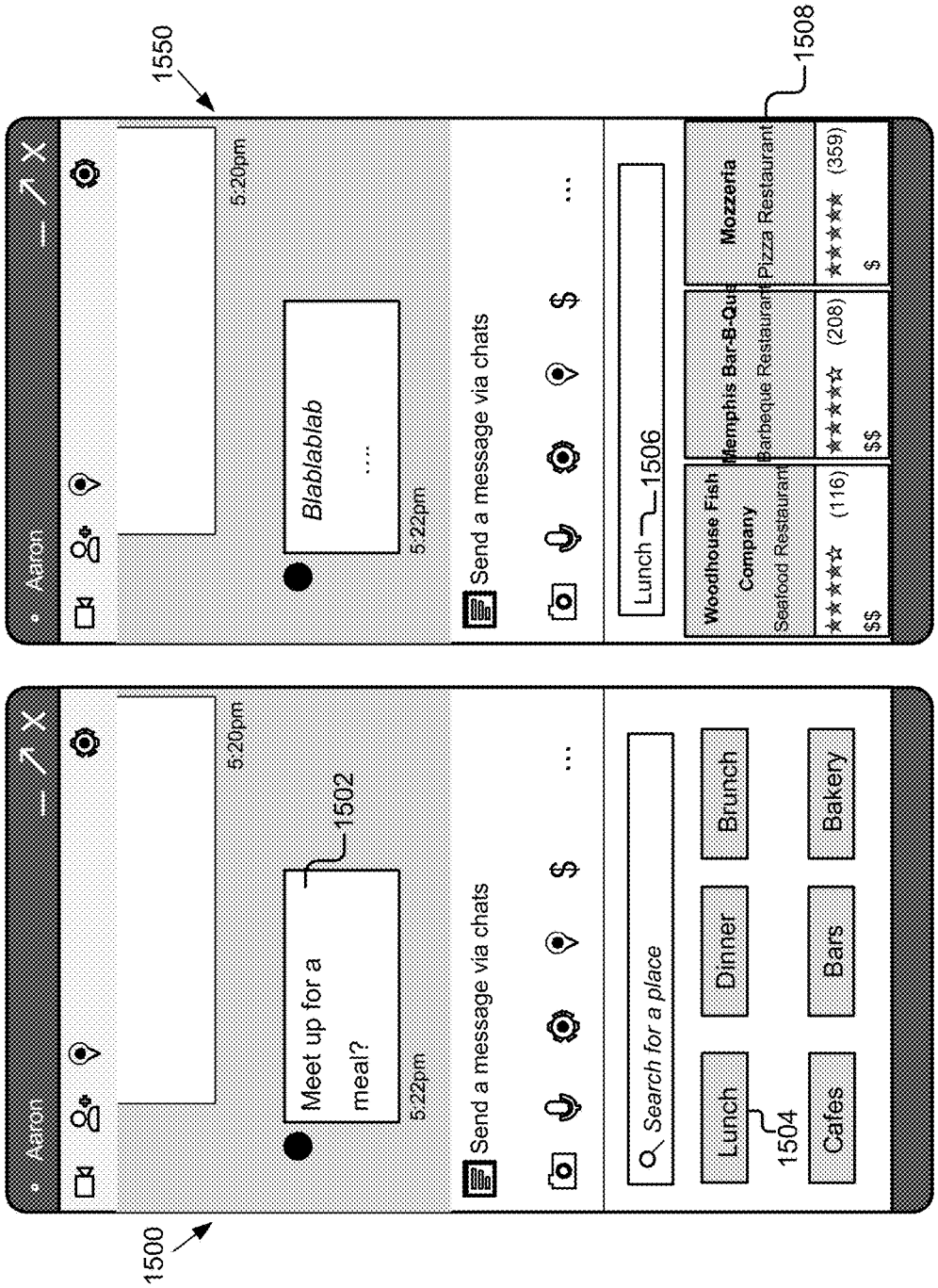
FIG. 15 includes graphic representations of example conversation interfaces showing serial presentation of suggestions.

In other instances, the user interface engine 236 generates multiple suggestion tools for serially presenting one or more suggestions. For example, upon receiving the message "meet up for a meal," the user interface engine 236 shows options for lunch or dinner. Upon a user selection of lunch, the user interface engine 236 shows the restaurants open for lunch. Or upon receiving message "meet for coffee next day," the user interface engine 236 shows a calendar tool first. The user interface engine 236 may also highlight times on the calendar when all users are available. Once a time is selected, the user interface engine 236 shows a map of coffee shops open at that time. Or upon receiving a message "buy skiing equipment in Los Angeles," the user interface engine 236 first shows a map of sports stores in Los Angeles. After a store is selected, the user interface engine 236 shows a purchase tool for equipment in that store. An example conversation interface showing serial presentation of suggestions is depicted in FIG. 15.

In the above and following descriptions, for purposes of explanation, numerous specific details are set forth in order to provide a thorough understanding of the specification. It will be apparent, however, to one skilled in the art, having had the benefit of the present disclosure, that the technology can be practiced without these specific details. In other instances, structures and devices are shown in block diagram form in order to avoid obscuring the description. For example, the specification is described in some instances above with reference to user interfaces and particular hardware. However, the description applies to any type of computing device that can receive data and commands, and any peripheral devices providing services.

Figure 3:
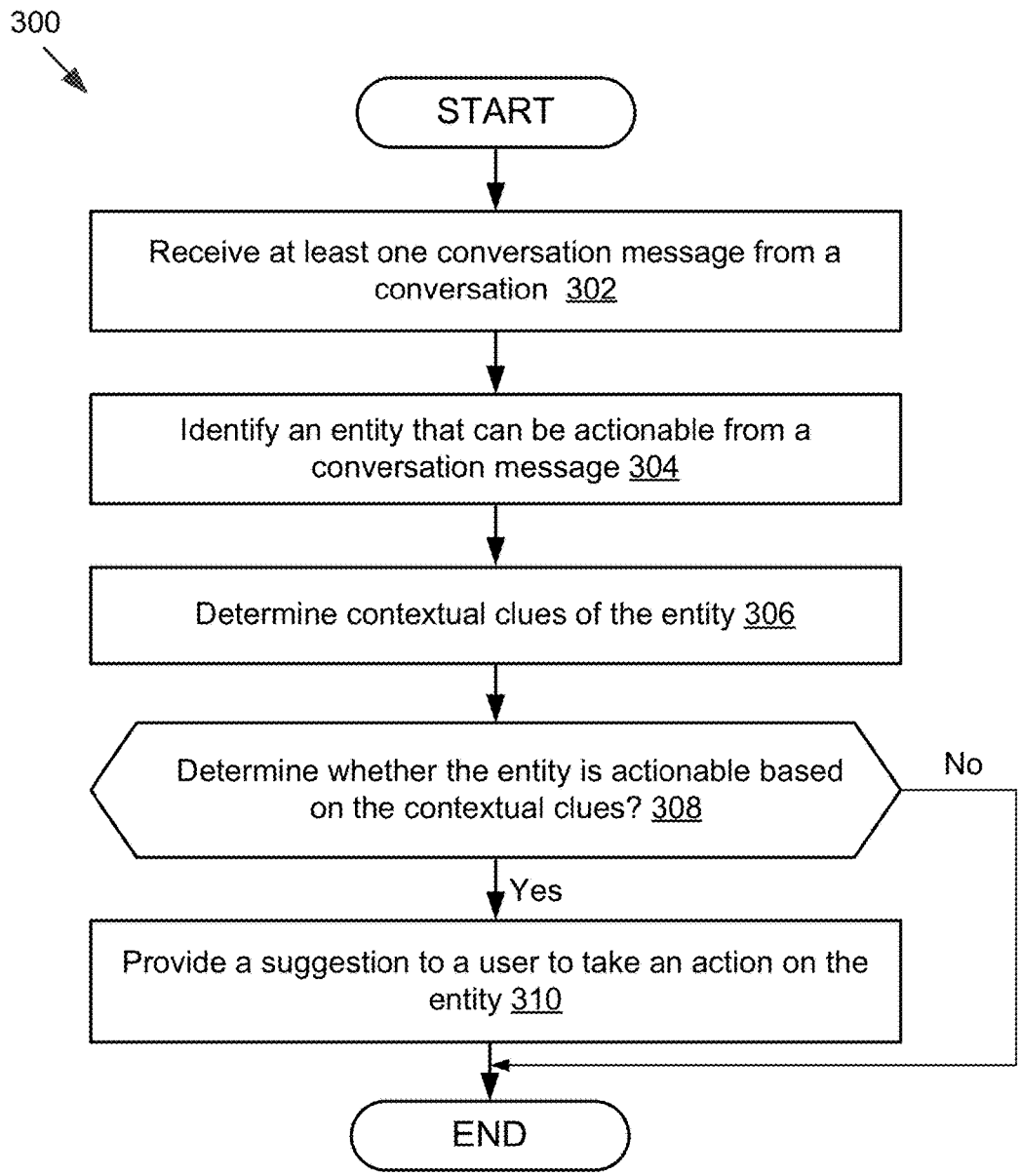
FIG. 3 is a flowchart of an example method for identifying an entity from a conversation and generating a suggestion for a user to take an action on the entity.

FIG. 3 includes a flowchart of an example method 300 for identifying an entity from a conversation and generating a suggestion for a user to take an action on the entity. The method 300 begins by receiving 302 at least one conversation message from a conversation. A conversation message may include a video message, an audio message, a text message, etc. The method 300 then identifies 304 an entity that can be actionable from a conversation message and determines 306 contextual indicators of the entity. The entity can be a person in a conversation message, an object in the conversation message, etc. In one example, the conversation analyzer 226 discussed in further detail with reference to FIG. 2 above may identify the entity and determine contextual indicators. For example, the conversation analyzer 226 may identify a location entity from a conversation message and determine contextual indicators of the location entity. For instance, for the location entity, the conversation analyzer 226 may determine contextual indicators based on when the location was mentioned, who mentioned the location in the conversation, which content of the conversation caused the location be perceived, which kind of content followed the location in the conversation, prior sentiment expressed toward the entity and/or related entities in prior conversations, etc.

The method 300 next determines 308 whether the entity is actionable based on the contextual indicators. In one example, the determining engine 228 discussed in further detail with reference to FIG. 2 may determine an actionable entity. For example, if the conversation analyzer 226 identifies the location entity "supermarket C" from a message "meet at supermarket C" between user A and user B in the conversation, the determining engine 228 may determine that this location entity "supermarket C" is actionable because users A and B will meet at the place. If the determining engine 228 determines that the entity is actionable, the method 300 moves to step 310. Otherwise, the method 300 ends. The method 300 provides 310 a suggestion to a user to take an action on the entity. In one example, the suggestion generator 230 discussed in further detail with reference to FIG. 2 above may provide a suggestion. For example, the suggestion generator 230 provides a map to "supermarket C" and a public transport tool to direct how a user can get to the "supermarket C." In some implementations, the suggestion is provided to all participants of the conversation. In some other implementations, the suggestion is provided to a subset of the participants of the conversation. Moreover, in some implementations the suggestion may initially be provided to one or more participants without immediate incorporation of the suggestion into the transcript of the conversation. In some of those implementations, the suggestion may only be incorporated into the transcript in response to one or more (e.g., at least a threshold quantity of) providing "affirmative" user interface input directed toward the suggestion.

Figure 4:
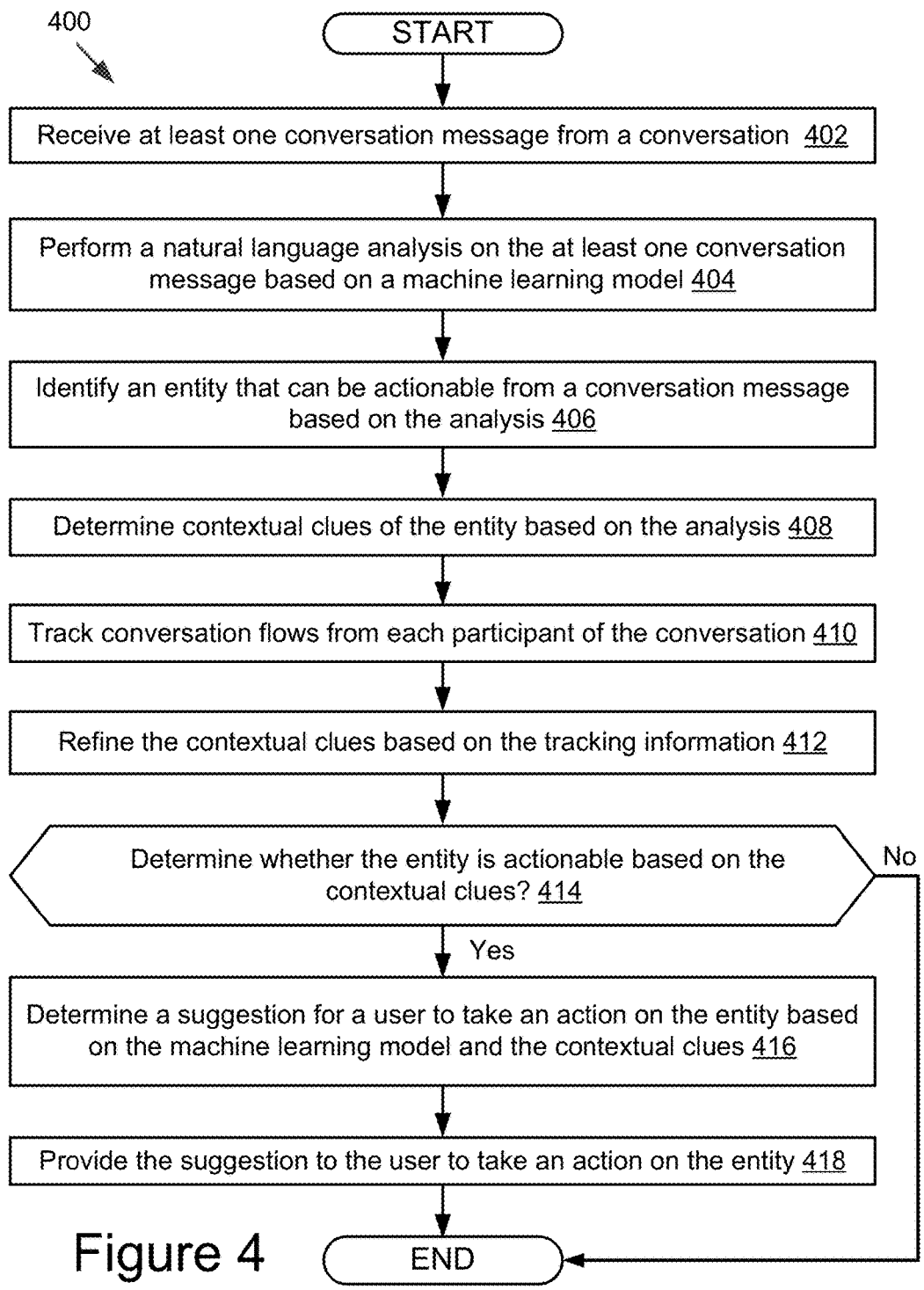
FIG. 4 is a flowchart of a specific example method for identifying an entity from a conversation and generating a suggestion for a user to take an action on the entity.

FIG. 4 is a flowchart of a specific example method 400 for identifying an entity from a conversation and generating a suggestion for a user to take an action on the entity. The method 400 receives 402 at least one conversation message from a conversation. The method then performs 404 a natural language analysis (NLP) on the at least one conversation message based on a machine learning model, and identifies 406 an entity that can be actionable from a conversation message based on the analysis. For example, the conversation analyzer 226 determines entities "beautiful," "weather" and "Store A" from a conversation message by parsing, extracting, and pattern matching. The conversation analyzer 226 then determines that "beautiful" is an adjective, "weather" is a noun, and "Store A" is a location based on the language semantic analysis using the SAFT library. An entity identified by the conversation analyzer 226 can be actionable or non-actionable depending on whether it is determined that a user can take an action on it.

Next, the method 400 determines 408 contextual indicators of the entity based on the analysis. For example, the conversation analyzer 226 performs the NLP based on pattern matching in combination with user information. For instance, the conversation analyzer 226 can detect, from a conversation message, a "Coffee house" near user A instead of any arbitrary "Coffee house" in a city based on pattern matching in combination with user information of user A. The conversation analyzer 226 may additionally or alternatively determine contextual indicators by performing sentiment analysis on a conversation message and associating the conversation message with a weight. For example, the conversation analyzer 226 receives messages "I hate coffee," "tea is ok" and "coke is my favorite" from user A, and associates a most favorable to least favorable sentiment weight to coke, tea and coffee, respectively. The weight indicates user A's beverage taste. The conversation analyzer 226 may additionally and/or alternatively analyze a conversation to determine the tense (e.g., whether a conversation message is in the past tense) and/or the recency of the conversation message (e.g., whether a conversation message is new, how to weigh a new or old conversation message); and/or or collects user profile information (e.g., an age, a gender) and/or conversation metadata (e.g., a start time and an end time of a conversation, participants of the conversation, timestamps associated with each conversation message) as contextual indicators.

The method 400 further tracks 410 conversation flows from each participant of the conversation and refines 412 the contextual indicators based on the tracking information. For example, the conversation analyzer 226 tracks users for possible participants of a conversation and determines which participant sends which message in what order. For example, the conversation analyzer 226 identifies an entity "hiking" from a message "do you want to go hiking?" sent from user A when talking with user B today. The conversation analyzer 226 tracks conversation flows and determines that a message "I prefer fishing than hiking" from user B in a previous conversation should be used as contextual indicators for the entity "hiking."

The method 400 determines 414 whether the entity is actionable based on the contextual indicators. The determining engine 228 determines whether an entity is actionable based on a conversation flow. For example, user A enters a question "meet at ABC?" The determining engine 228 will not determine whether the location "ABC" is actionable until receiving user B's answer in the conversation flow. The determining engine 228 determines whether an entity is actionable based on the tense of the message. For example, the determining engine 228 may determine an entity in a past tense message is non-actionable. The determining engine 228 also determines whether an entity is actionable based on sentiment indicators and other contextual indicators. If the determining engine 228 determines that the entity is actionable, the method 400 moves to step 416. Otherwise, the method 400 ends.

The method 400 determines 416 a suggestion for a user to take an action on the entity based on the machine learning model and the contextual indicators. For example, if a user talks about taking a flight to Las Vegas next weekend, the determining engine 228 determines an actionable entity "flight" and the suggestion generator 230 offers a suggestion of a flight itinerary (e.g., time and airline) based on user's previous purchase history learned in the machine learning model. The method 400 provides 418 the suggestion to the user to take an action on the entity.

Figure 5:
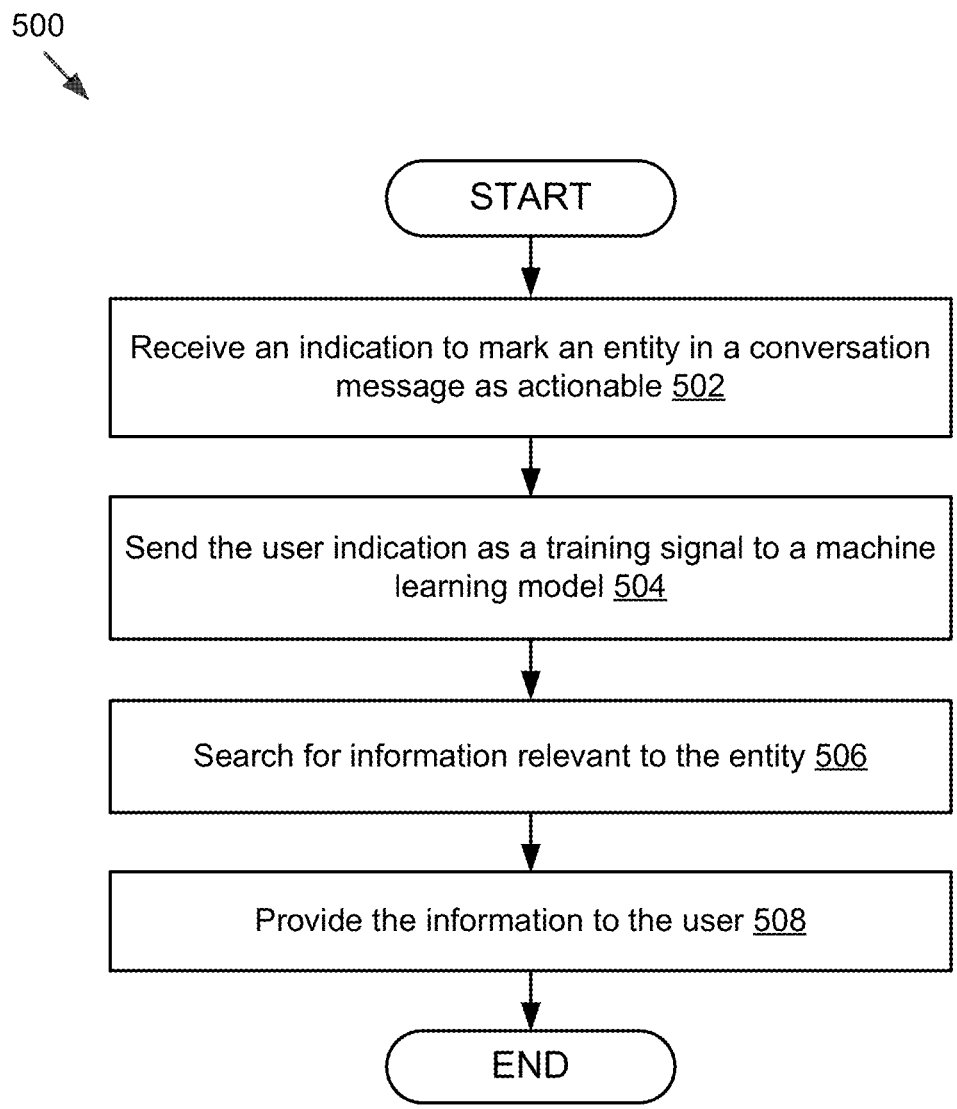
FIG. 5 is a flowchart of an example method for manually determining an actionable entity from a conversation.

FIG. 5 is a flowchart 500 of an example method for manually determining an actionable entity from a conversation. The method 500 receives 502 an indication to mark an entity in a conversation message as actionable. In some instances, the indication to mark the entity in a conversation message as actionable is received from a user (e.g., based on user interface input directed to term(s) in the conversation message that correspond to the entity). The method 500 sends 504 the user indication, and optionally additional data (e.g., the conversation message, contextual indicators) as a training signal to a machine learning model. The method 500 searches 506 for information relevant to the entity and provides 508 the information to the user. For example, a user determines "Green Park Museum" is the most important word in a message and indicates that this word is actionable by flagging the word. Responsive to receiving this indication, the determining engine 228 searches information related to "Green Park Museum" and retrieves the top five results to the user. The determining engine 228 also sends the indication as a training signal to train a machine learning model.

Figure 6:
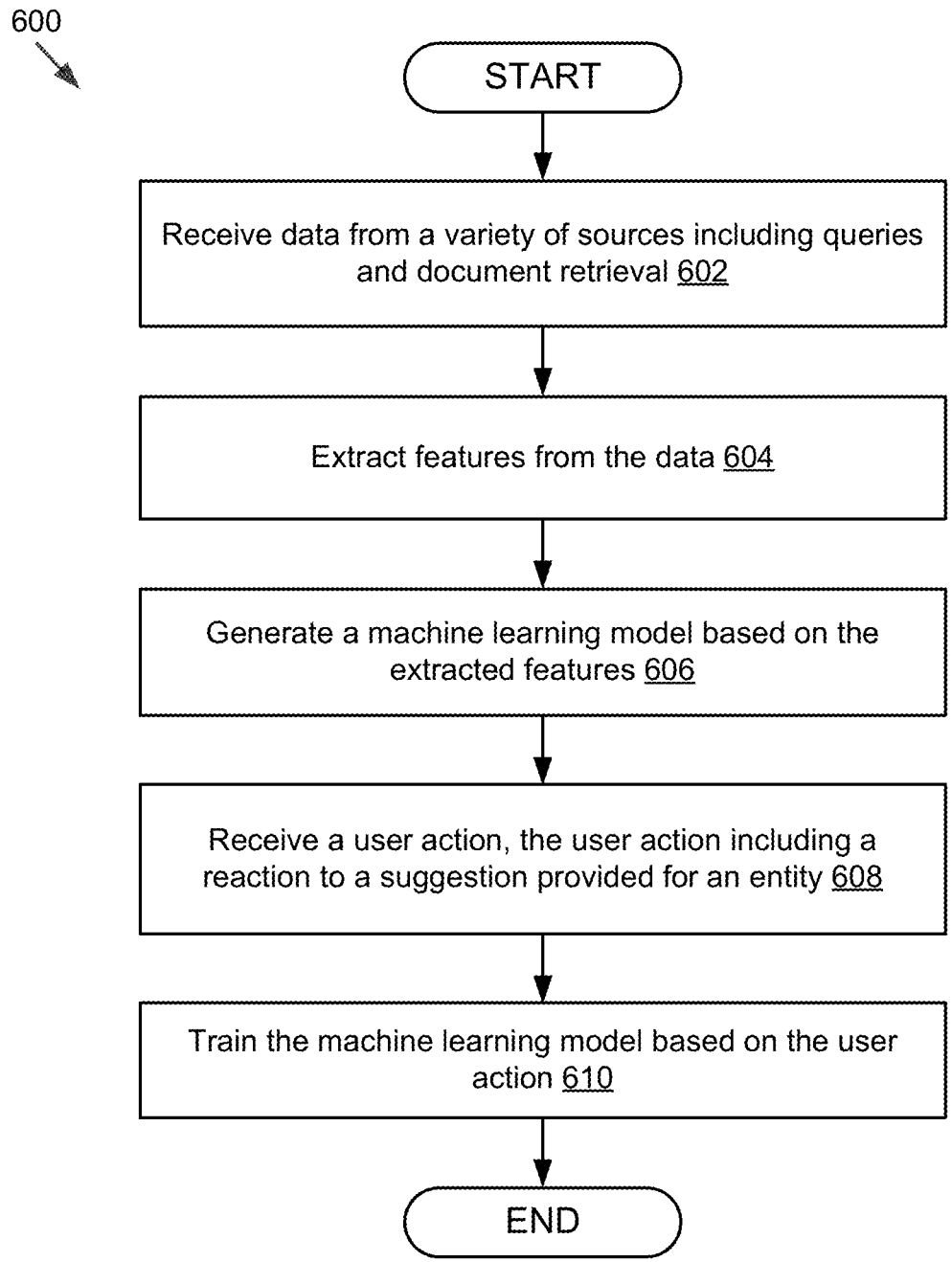
FIG. 6 is a flowchart of an example method for generating and updating a machine learning model.

FIG. 6 is a flowchart 600 of an example method for generating and updating a machine learning model. In one example, the model builder 224 discussed in further detail with reference to FIG. 2 above may generate and update a machine learning model. The method 600 receives 602 data from a variety of sources including queries and document retrieval, extracts 604 features from the data and generates 606 a machine learning model based on the extracted features. For example, the model builder 224 includes a user's search history into the model. In another example, upon receiving a collection of documents returned for a query and ranks associated with each document, the model builder 224 builds the model to include the ranks to show the relevancy between a document and the query. The model builder 224 may also generate the model to include user statistics, user behavior pattern data, a sequence of weights and multipliers that are used to make predictions about a user action. The model builder 224 generates the machine learning model and trains the model over time to understand the semantics of a conversation and derives meaning from the real time conversation. As the model evolves, the efficiency and accuracy of using the model in suggestion making, behavior prediction, etc., are improved.

The method 600 receive 608 a user action, the user action including a reaction to a suggestion provided for an entity, and trains 610 the machine learning model based on the user action. This may include generating a training example based on the user action and other associated data and training the machine learning model based on the training example. For example, the model builder 224 learns that a user never buys anything that was offered in a conversation interface with a purchase tool. In another example, the model builder 224 receives a comment "I do not like this airline" regarding a flight itinerary suggestion. The model builder 224 takes this negative reaction as a signal to train the model. As a result, a different airline may be suggested to the user in the future.

Figure 7:
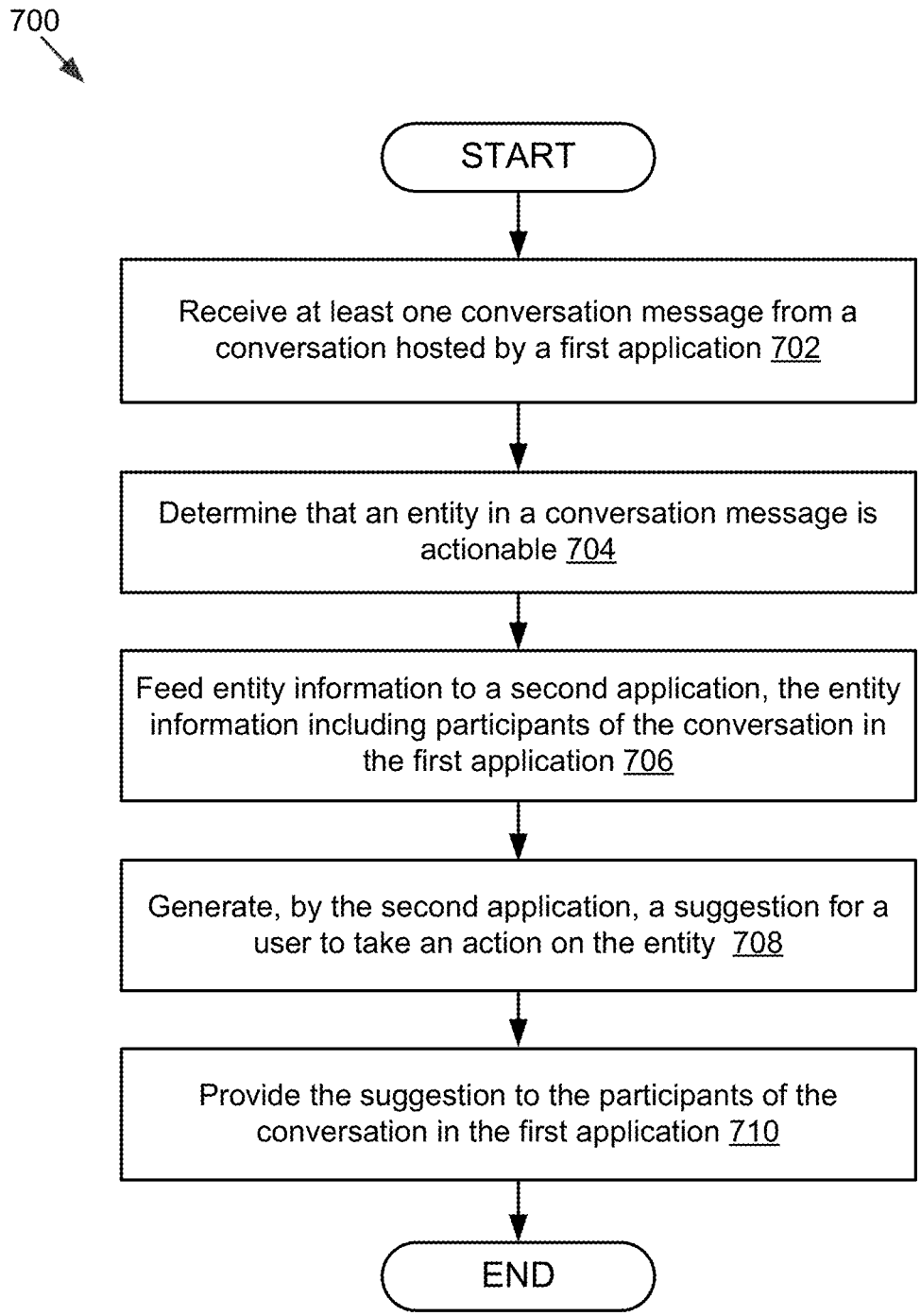
FIG. 7 is a flowchart of an example method for feeding entity information from a first application to a second application to generate a suggestion.

FIG. 7 is a flowchart 700 of an example method for feeding entity information from a first application to a second application to generate a suggestion. The method 700 receives 702 at least one conversation message from a conversation hosted by a first application and determines 704 that an entity in a conversation message is actionable. The method 700 feeds 706 entity information to a second application, the entity information including participants of the conversation in the first application. Next, the method moves to step 708, where the second application generates a suggestion for a user to take an action on the entity. For example, if a flight number is mentioned in a conversation, the suggestion generator 230 notifies a third-party server to provide flight feeds (e.g., delay information) to a user. If the user mentions a friend that the user likes in the conversation, the suggestion generator 230 communicates with an advertisement application to use this information to target the user with advertising. The method 700 provides 710 the suggestion to the participants of the conversation in the first application. For example, if user A mentions weather in a conversation with user B and user C, a weather service may send a hourly weather report to users A, B and C after receiving entity information of "weather" from the suggestion generator 230.

Figure 8:
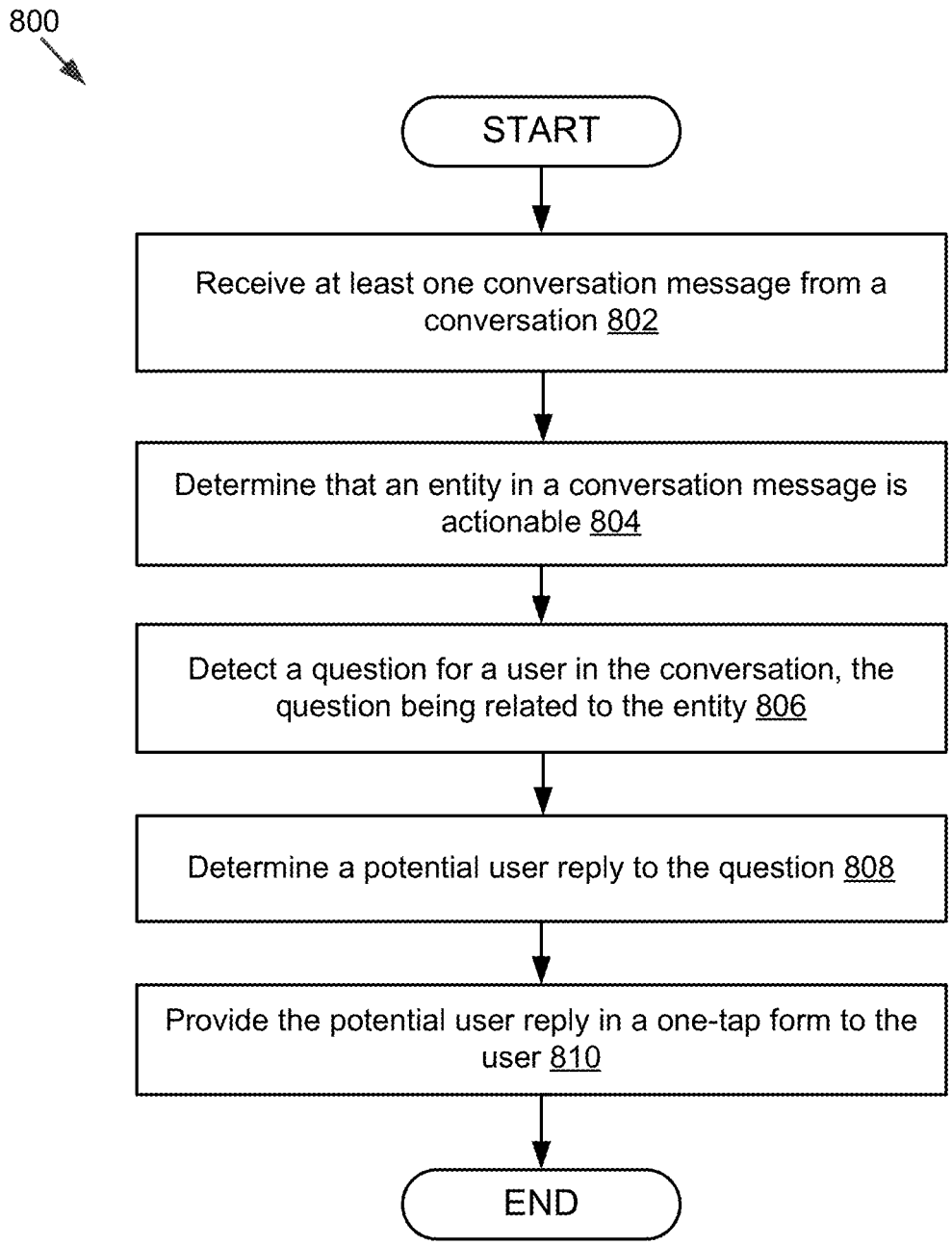
FIG. 8 is a flowchart of an example method for predicting a potential user reply in a conversation.

FIG. 8 is a flowchart 800 of an example method for predicting a potential user reply in a conversation. The method 800 receives 802 at least one conversation message from a conversation and determines 804 that an entity in a conversation message is actionable. The method 800 then detects 806 a question for a user in the conversation, the question being related to the entity and determines 808 a potential user reply to the question. In one example, the response predictor 232 discussed in further detail with reference to FIG. 2 below may detect a question and determine a potential user reply. For example, if the response predictor 232 learns that 30% of the time people respond A and 70% of the time people respond B to a question, the response predictor 232 may supply answer B for a user that is going to answer the same question. The response predictor 232 also determines a potential reply based on contextual indicators (e.g., users' location, context, and other personal information). For example, given the messages "I hate coffee" and "the tea house on the X street is the best" from user A in previous conversations, the response predictor 232 can easily supply the address of "the tea house on the X street" as the potential answer for user A when user B asks user A "which is your favorite place for coffee or tea?."

The method 800 provides 810 the potential user reply in a one-tap form to the user. For example, when user A sends user B a chat conversation, the response predictor 232 can send a one-tap suggestion saying that "I am driving" or even send "I will be home in 20 minutes" for user B to respond user A. In response to on-tap selection of the one-tap suggestion, the suggestion may then be incorporated in a transcript of the chat conversation. When user B is flying and does not turn on the cell phone, the response predictor 232 can still automatically respond "I will be available four hours later" for user B based on a calendar.

Figure 9:
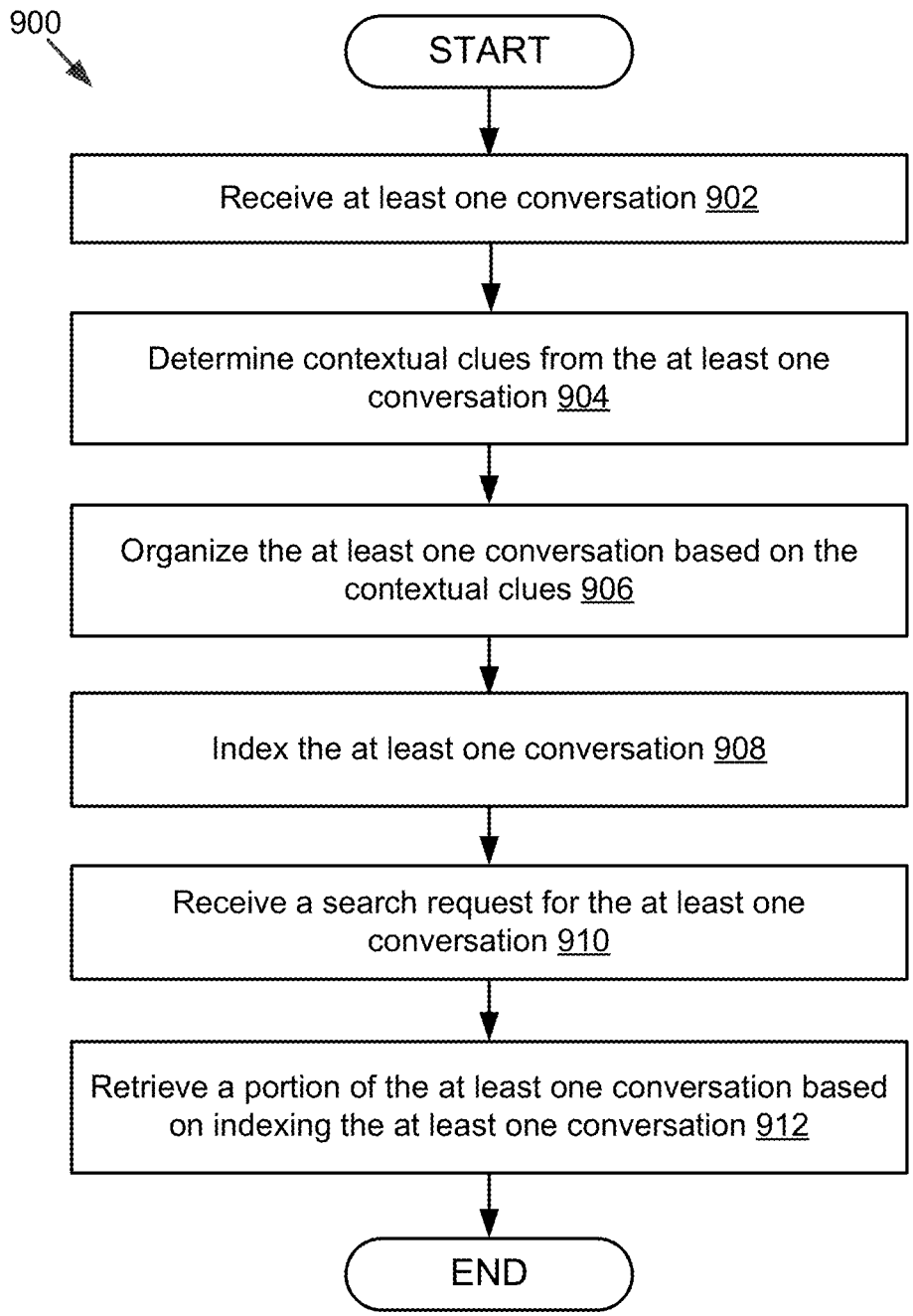
FIG. 9 is a flowchart of an example method for selectively retrieving conversations and/or conversation messages in response to search requests.

FIG. 9 is a flowchart 900 of an example method for selectively retrieving conversations and/or conversation messages in response to search requests. The method 900 receives 902 at least one conversation and determines 904 contextual indicators from the at least one conversation. The method 900 organizes 906 the at least one conversation based on the contextual indicators and indexes 908 the at least one conversation. In one example, the report module 234 discussed in further detail with reference to FIG. 2 above may organize and index the conversation. The report module 234 may organize the conversations based on participant identities, entities referenced in the conversations, times of the conversation messages, other conversation content, and the like. In one example, the report module 234 may organize the conversations that mention a location in a descending time order. The report module 234 may also organize the conversations based on conversation flows. For example, if a user says "I will search it," the report module 234 may determine that the next message in the conversation flow will be the word that the user specified in the search box and may organize the conversation in this order. The report module 234 may also organize and index the conversations based on sentiment and other contextual indicators.

The method 900 receives 910 a search request for the at least one conversation and retrieves 912 a portion of the at least one conversation based on indexing the at least one conversation. For example, responsive to receiving a search request for conversations talking about a movie, the report module 234 generates a report for a user based on organizing the conversations by searching conversation content about the movie, ordering conversations according to the timeline of the conversations, associating each conversation message in a conversation with a user and a time, highlighting the important entities (e.g., movie names, theater names, show time, etc.,) and providing references back to the previous conversations based on the indexes.

FIG. 10 includes graphic representations of example conversation interfaces showing a suggestion. In the illustrated example, the conversation interfaces 1000, 1050 are displayed on Aaron's mobile screen. Aaron receives a message 1002 "Want to eat at Park Chow?" from Bob. The suggestion application 132b, which is described above with reference to FIGS. 1 and 2, determines that the location "Park Chow" is actionable. A suggestion therefore can be generated for Aaron and Bob to take an action on the location. In this example, the suggestion application 132b generates a map 1004 of the location "Park Chow" for Aaron and/or Bob. Aaron and/or Bob can view the map 1004 or share the map 1004 using the share button 1006. In this scenario, the map 1004 is displayed twice before and after Aaron sends a message 1008 "Sure" to respond the message 1002. In a different scenario, the determining engine 228 determines that the location "Park Chow" is actionable only if Aaron positively answers the question 1002, for example, with the message 1008 "Sure". As a result, the location suggestion (e.g., the map 1004) may only be displayed once after Aaron sends the message 1008. In other words, the location suggestion may not be incorporated into the transcript of the conversation until Aaron sends the message 1008 via interaction with the affirmative interaction element "Sure"". Aaron and Bob may alternatively select the "Umm, nope" option 1010 to indicate that the map is not the suggestion the users want or the map is wrong or other negative reactions. In those situations the suggestion may be discarded without static implementation into a transcript of the conversation. In FIG. 10, the entire suggestion generation process is handled by a suggestion application 132.

FIG. 11A is a graphic representation of an example conversation interface showing a conversation generated by a conversation service. An ongoing conversation between users Melissa G., Alice Z., Chris B. is displayed on the conversation interface 1100. The users Melissa G., Alice Z., Chris B may be members of a social network in this non-limiting example. The conversation session between the users is generated and managed by a first application (e.g., a suggestion application 132) in the social network. The conversation interface 1100 can be displayed on Melissa's computer screen. In this example, the users converse about a plan that night, Melissa expresses interest in shopping and states that "Dress Factory is good. I am wondering if they have any discount right now." When the suggestion application 132b identifies that the important entities in this message are "Dress Factory" and "discount," the suggestion application 132b generates a suggestion based on these important entities. However, instead of generating a suggestion by the suggestion application 132b as in FIG. 10, the suggestion application 132b feeds the information "Dress Factory" and "discount" to another service (e.g., a third-party promotion service) to generate a suggestion.

Now referring to FIG. 11B, which is a graphic representation of an example conversation interface showing a suggestion generated by a third-party promotion service. In the illustrated example, the conversation interface 1150 is displayed on Melissa's mobile screen. The conversation interface 1150 includes a suggestion 1152 "Dress Factory has 20% off for dress and jewelry until May 30." The promotion service generates suggestion 1152 based on the entities "Dress Factory" and "discount" identified by the suggestion application 132b in FIG. 11A (e.g., after being fed that information by a separate server handling the conversation). In one example, the promotion service may perform a search for the entities on the Internet to generate the suggestion 1152. The suggestion generator 132b may receive the suggestion 1152 and then provide the suggestion 1152 to all, or a subset of, participants of the conversation in FIG. 11A, e.g., Melissa G., Alice Z., and/or Chris B. FIG. 11B displays the suggestion 1152 on a mobile screen of Melissa, identical to the suggestions shown to Alice or Chris.

Figure 12:
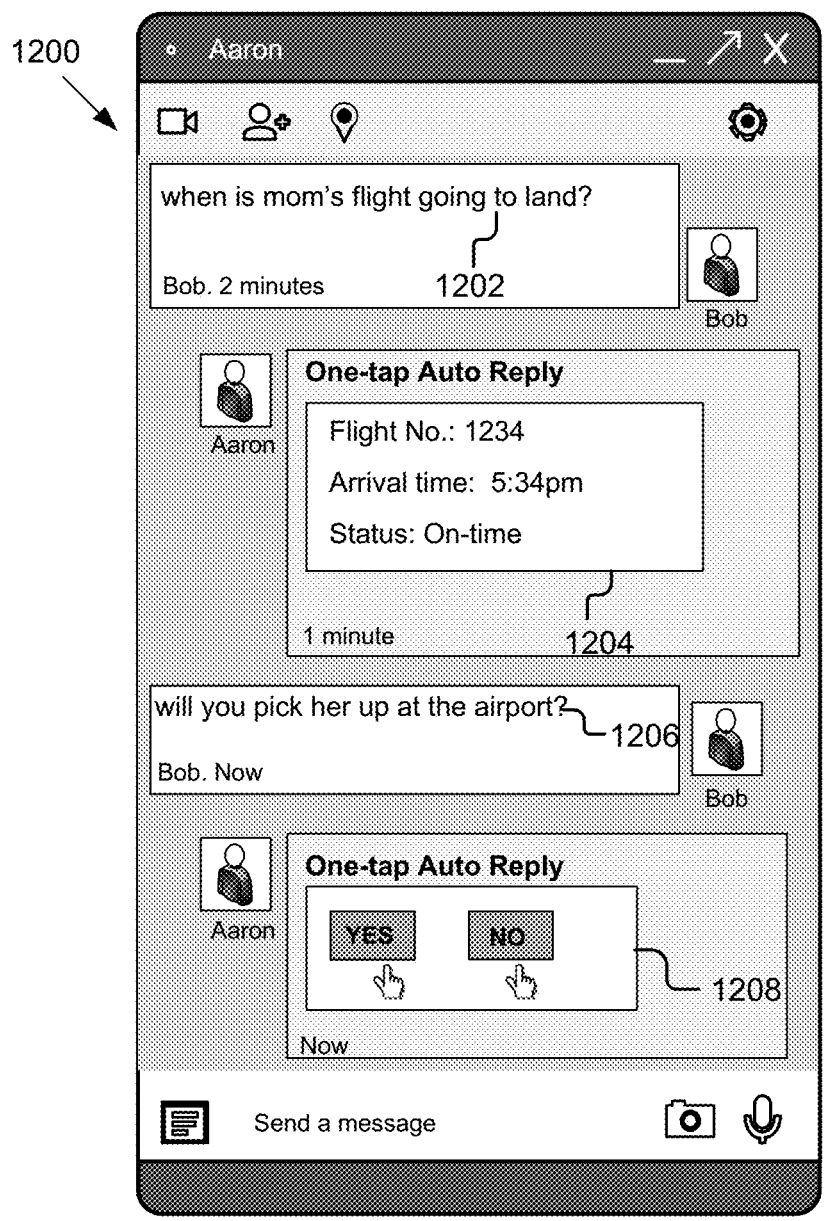
FIG. 12 is a graphic representation of an example conversation interface showing one-tap replies.

FIG. 12 is a graphic representation of an example conversation interface showing one-tap replies. In the illustrated FIG. 12, the conversation interface 1200 is displayed on Aaron's mobile screen. Responsive to receiving a question 1202 "when is mom's flight going to land?" from Bob, the suggestion application 132b may predict a potential response from Aaron based on previous user actions of Aaron (e.g., a purchase history), and generates a one-tap reply 1204 for Aaron. The auto reply 1004 lists the flight number, the arrival time and a flight status. Aaron therefore saves time to type an answer to Bob. Similarly, when Bob sends another question 1206 "will you pick her up at the airport?," the suggestion application 132b determines that this is a yes or no question, and generates a one-tap auto reply 1008 to include two options "YES" or "NO" for Aaron to choose.

FIG. 13 is a graphic representation of an example conversation interface showing a conversation report. The conversation interface 1300 includes a search box 1302, where the user can search for conversations based on participant name, topic, time, combinations thereof, etc. In the illustrated example in FIG. 13, the user searched for conversations about a movie "star wars." Responsive to the search request from the user, the suggestion application 132b may generate a report. In certain examples, the report may start with a summary 1304 on when the user discussed the topic and the other participants in the conversations, e.g., that Mellissa, Alice and Jenny discussed "star wars" between 7:10-7:30 pm on Wednesday. The report may also include the conversation messages from each participant in a time order. The report may also highlight the keyword "star wars" 1306 searched by the user. In addition, the report may highlight certain entities (e.g., actors "AA" 1108 and "BB" 1310), to enable the user to retrieve more information (e.g., biography, photos) on the entities. Each highlighted and identified entity may be associated with a hyperlink that enables the user to perform a search for the entity on the Internet.

FIG. 14 is a graphic representation of an example conversation interface showing a conversation summary. In the illustrated example, the conversation interface 1400 includes a conversation summary 1402 generated by the suggestion application 132b for a user summarizing the conversations that the user participated in during a week. The conversation summary may include two exemplary portions 1402 and 1404. In the first portion 1402, the summary may include the number of conversations the user participated in during the past week, and some basic information on the conversations, e.g., time of day, date, identities of the other participants, and the like. The first portion 1402 may also include a detail option 1406 for each conversation that provides further details on each conversation including conversation messages from each participant, the time when each message was sent, etc. The second portion 1404 may include salient information on the conversations conducted in the past week including, for example, the topics discussed in the conversations (optionally, a pie chart 1408 describing the percentage of each topic in the conversations), audio/visual content shared in the conversations (optionally, a link 1410 to play the content), the photos 1412 shared in the two conversations.

FIG. 15 includes graphic representations of example conversation interfaces showing serial presentation of suggestions. In the illustrated FIG. 15, the conversation interface 1500 is displayed on a user's mobile screen. Responsive to receiving a message 1502 "meet up for a meal?," the suggestion application 132b generates and displays options 1504 for "lunch," "dinner," "brunch," etc. The user may select one of the options 1504 first suggested to the user and triggers a second suggestion to be generated. FIG. 15 displays a conversation interface 1550 generated responsive to receiving the user selection as shown in the option 1506. Upon the user's selection for lunch in the option 1506, the suggestion application 132b generates and displays certain restaurants open for lunch. In certain implementations, the suggestion application 132b may display only those restaurants that are within a certain distance range of all of the participants in the conversation. In some examples, the restaurant information 1508 may include a restaurant name, a restaurant type, a review and a price.

In certain implementations, the displayed restaurant information may be selectable and actionable. In one example, the user may select a particular restaurant and display it to the other participants in the conversation, e.g., as a message including the restaurant name, as a message including the restaurant name and prefilled default words suitable to the conversation (e.g., "let's meet at . . . "). In another example, the user may select a particular restaurant to perform a search for the restaurant on the Internet, retrieve merchant information from a website, retrieve a map of the restaurant location, and the like. The user may then choose to display the retrieved information to the other participants in the conversation, e.g., by inserting a map of the restaurant location into the conversation interface.

Reference in the specification to "some instances" or "an embodiment" means that a particular feature, structure, or characteristic described in connection with the embodiment is included in at least some instances of the description. The appearances of the phrase "in some instances" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The specification also relates to an apparatus for performing the operations herein. This apparatus may be specially constructed for the required purposes, or it may include a general-purpose computer selectively activated or reconfigured by a computer program stored in the computer. Such a computer program may be stored in a non-transitory computer readable storage medium, such as, but is not limited to, any type of disk including floppy disks, optical disks, CD-ROMs, and magnetic disks, read-only memories (ROMs), random access memories (RAMs), erasable programmable read-only memory (EPROMs), electrically erasable programmable read-only memory (EEPROMs), magnetic or optical cards, flash memories including USB keys with non-volatile memory or any type of media suitable for storing electronic instructions, each coupled to a computer system bus.

The specification can take the form of an entirely hardware embodiment, an entirely software embodiment or embodiments containing both hardware and software elements. In some instances, the specification is implemented in software, which includes but is not limited to firmware, resident software, microcode, etc.

Furthermore, the description can take the form of a computer program product accessible from a non-transitory computer-usable or computer-readable medium providing program code for use by or in connection with a computer or any instruction execution system. For the purposes of this description, a non-transitory computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or social network data stores through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the various components of the system.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats. Furthermore, as will be apparent to one of ordinary skill in the relevant art, the modules, routines, features, attributes, methodologies and other aspects of the disclosure can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of the specification, which is set forth in the following claims.

What is claimed is:

1. A computer-implemented method comprising:
receiving, using one or more processors, an electronic message submitted by a first user for display in a transcript of a message exchange thread,
the electronic message submitted in response to user interface input provided by the first user via a client device of the first user, and
the message exchange thread being between at least the first user and a second user via a first message exchange client of the first user and a second message exchange client of the second user;
identifying, using one or more of the processors, an entity from the electronic message;
determining, using one or more of the processors, contextual indicators of the entity;
determining, using one or more of the processors, whether the entity is actionable based on the contextual indicators; and
responsive to determining that the entity is actionable:
providing, for presentation via the first message exchange client and the second message exchange client, a suggestion that is directed to the entity, wherein the suggestion includes a first suggestion for the first message exchange client and a second suggestion for the second message exchange client, and wherein the first suggestion and the second suggestion are each directed to the entity.

2. The method of claim 1, wherein responsive to determining that the entity is actionable, the suggestion is provided for presentation to the second user via the second message exchange client, and further comprising:
receiving an affirmative selection of the suggestion by the second user via the second message exchange client; and
responsive to the affirmative selection, providing content based on the suggestion for presentation to the first user via the first message exchange client.

3. The method of claim 2, wherein the content based on the suggestion is the suggestion itself, wherein the suggestion includes one or more of:

a message reply to a question associated with the entity;
a travel itinerary for a location associated with the entity; or
a destination based on an activity associated with the entity.

4. The method of claim 1, wherein responsive to determining that the entity is actionable the suggestion is provided for presentation without incorporation of the suggestion in the transcript of the message exchange thread, and further comprising:
receiving an affirmative selection of the suggestion; and
responsive to the affirmative selection, incorporating content that is based on the suggestion in the transcript of the message exchange thread.

5. The method of claim 1, wherein responsive to determining that the entity is actionable the suggestion is provided for presentation without incorporation of the suggestion in the transcript of the message exchange thread, wherein the suggestion includes an affirmative interface element and a negative interface element and further comprising:
monitoring for selection of either the affirmative interface element or the negative interface element; and
incorporating content that is based on the suggestion in the transcript of the message exchange thread only in response to selection of the affirmative interface element.

6. The method of claim 1, further comprising:
responsive to determining that the entity is actionable:
transmitting the entity to a third-party server; and
receiving the suggestion from the third-party server in response to transmitting the entity.

7. The method of claim 1, wherein determining the contextual indicators includes determining at least one contextual indicator based on a separate prior message exchange thread that involves at least one of the first user and the second user.

8. The method of claim 7, wherein the at least one contextual indicator is based on sentiment expressed by at least one of the first user and the second user in one or more prior messages of the prior message exchange thread.

9. The method of claim 8, wherein the sentiment is directed to the entity and wherein determining the at least one contextual indicator comprises determining the at least one contextual indicator based on the sentiment being directed to the entity.

10. The method of claim 1, wherein determining the contextual indicators includes determining at least one contextual indicator based on performing a sentiment analysis of prior messages of the first user or the second user, the prior messages being in the message exchange thread or a prior message exchange thread, wherein performing the sentiment analysis includes:
associating the prior messages with respective weight magnitudes based on content of the prior messages; and
determining an overall sentiment based on a combination of the respective weight magnitudes of the prior messages, wherein the overall sentiment is used in determining the at least one contextual indicator.

11. The method of claim 10, wherein performing the sentiment analysis is based at least in part on a non-textual graphical element included in the prior messages, wherein the prior messages are in the prior message exchange thread and wherein the at least one contextual indicator is selected based on the overall sentiment being directed toward the entity in the prior messages.

12. The method of claim 1, wherein the suggestion is provided for presentation to the second user and wherein the contextual indicators are based on a prior message of the first user, the prior message being submitted by the first user in a prior message exchange thread that does not involve the second user.

13. The method of claim 1, wherein the first suggestion and the second suggestion are different versions of the suggestion based on a geographic location of the first message exchange client and a geographic location of the second message exchange client.

14. The method of claim 1, further comprising:
tracking conversation flows from each participant of the message exchange thread to create tracking information; and
generating the contextual indicators based on the tracking information, wherein the contextual indicators include an indicator indicating whether a user answer is provided in the message exchange thread in response to a user question in the message exchange thread,
wherein determining whether the entity is actionable based on the contextual indicators includes determining that the entity is actionable based on the indicator indicating that the user answer is provided in the message exchange thread.

15. The method of claim 1, wherein determining the contextual indicators includes determining at least one contextual indicator based on a tense of one or more words in one or more messages of the message exchange thread.

16. The method of claim 1, further comprising:
receiving user input via the first message exchange client or the second message exchange client that designates a second entity in the electronic message as actionable; and
providing, for presentation via at least one of the first message exchange client and the second message exchange client, a different suggestion that is directed to the second entity.

17. The method of claim 1, further comprising:
indexing, in a computer readable medium, the message exchange thread based on the contextual indicators.

18. A computer program product comprising a non-transitory computer usable medium including a computer readable program, wherein the computer readable program when executed on a computer causes the computer to:
receive an electronic message submitted by a first user for display in a transcript of a message exchange thread,
the electronic message submitted in response to user interface input provided by the first user via a client device of the first user, and
the message exchange thread being between at least the first user and a second user via a first message exchange client of the first user and a second message exchange client of the second user;
identify an entity from the electronic message;
determine contextual indicators of the entity;
determine whether the entity is actionable based on the contextual indicators; and
responsive to determining that the entity is actionable:
provide, for presentation via the first message exchange client and the second message exchange client, a suggestion that is directed to the entity, wherein the suggestion includes a first suggestion for the first message exchange client and a second suggestion for the second message exchange client, and wherein the first suggestion and the second suggestion are each directed to the entity.

19. A system comprising:
one or more processors; and
memory storing instructions that, when executed, cause the system to:
receive an electronic message submitted by a first user for display in a transcript of a message exchange thread,
the electronic message submitted in response to user interface input provided by the first user via a client device of the first user, and
the message exchange thread being between at least the first user and a second user via a first message exchange client of the first user and a second message exchange client of the second user;
identify an entity from the electronic message;
determine contextual indicators of the entity;
determine whether the entity is actionable based on the contextual indicators; and
responsive to determining that the entity is actionable:
provide, for presentation via the first message exchange client and the second message exchange client, a suggestion that is directed to the entity, wherein the suggestion includes a first suggestion for the first message exchange client and a second suggestion for the second message exchange client, and wherein the first suggestion and the second suggestion are each directed to the entity.

* * * * *